(12) United States Patent
Bailey

(10) Patent No.: US 8,182,726 B2
(45) Date of Patent: May 22, 2012

(54) PROCESS FOR PREPARING LIME PELLETS

(75) Inventor: William R. Bailey, Las Vegas, NV (US)

(73) Assignee: Billian I.P. Limited, Tortola (VG)

( * ) Notice: Subject to any disclaimer, the term of this patent is extended or adjusted under 35 U.S.C. 154(b) by 886 days.

(21) Appl. No.: 11/932,713

(22) Filed: Oct. 31, 2007

(65) Prior Publication Data

US 2008/0216712 A1    Sep. 11, 2008

Related U.S. Application Data

(63) Continuation-in-part of application No. 11/134,797, filed on May 20, 2005, now Pat. No. 7,303,623.

(51) Int. Cl.
*B29C 67/00* (2006.01)

(52) U.S. Cl. .......... 264/117; 106/753; 106/792

(58) Field of Classification Search .......... 264/117; 106/753, 792
See application file for complete search history.

(56) References Cited

U.S. PATENT DOCUMENTS

| | | |
|---|---|---|
| 1,727,231 A | 9/1929 | Downard |
| 2,279,617 A | 4/1942 | Lewis |
| 2,411,634 A | 11/1946 | Pearson |
| 3,026,568 A | 3/1962 | Moar |
| 3,634,114 A | 1/1972 | Lufcy |
| 3,876,439 A | 4/1975 | Schneider |
| 4,094,697 A | 6/1978 | Rostler |
| 4,256,491 A | 3/1981 | Tate |
| 4,547,224 A | 10/1985 | Schilling |
| 4,561,901 A | 12/1985 | Schilling |
| 4,756,763 A | 7/1988 | Etnyre |
| 4,925,616 A | 5/1990 | Brown et al. |
| 5,004,799 A | 4/1991 | Kohls et al. |
| 5,137,753 A | 8/1992 | Bland et al. |
| 5,196,620 A | 3/1993 | Gustin et al. |
| 5,306,327 A | 4/1994 | Dingeman et al. |
| 5,512,093 A | 4/1996 | Huege et al. |
| 5,637,350 A | 6/1997 | Ross |
| 5,743,934 A | 4/1998 | Wommack et al. |
| 5,824,244 A | 10/1998 | Kelly et al. |

(Continued)

FOREIGN PATENT DOCUMENTS

KR    10-2006023806    3/2006

(Continued)

OTHER PUBLICATIONS

KR 2006023806 Mar. 15, 2006 Chun abstract only.*

(Continued)

*Primary Examiner* — Paul Marcantoni
(74) *Attorney, Agent, or Firm* — Workman Nydegger

(57) ABSTRACT

A lime pellet for use in asphalt applications is prepared to include lime fines and an asphalt-compatible binder. The pellet is characterized as having a rigid structure with a dimension greater than about 1.5 mm and being compatible with a hot mix asphalt so as to dissolve in liquid asphalt. The pellet is manufactured by mixing the lime fines with the asphalt-compatible binder and forming pellets therefrom. A benefit of the present method is the elimination of steps that cost time and money because limestone can be converted to quicklime, the quicklime is hydrated, and the pellet is formed in a continuous process or in a single system. The pellets are useful for conditioning an end product of hot mix asphalt during the manufacture of such an asphalt.

25 Claims, 6 Drawing Sheets

U.S. PATENT DOCUMENTS

| | | | |
|---|---|---|---|
| 5,997,599 | A | 12/1999 | Wommack et al. |
| 6,027,558 | A | 2/2000 | Little et al. |
| 6,514,334 | B1 | 2/2003 | Perry et al. |
| 6,613,138 | B2 | 9/2003 | Welshimer et al. |
| 6,824,600 | B2 | 11/2004 | Bailey et al. |
| 7,303,623 | B2 | 12/2007 | Bailey et al. |
| 7,309,390 | B2 | 12/2007 | Falkiewicz |
| 7,517,401 | B2 | 4/2009 | Bailey |
| 2003/0037704 | A1 | 2/2003 | Bailey et al. |
| 2006/0288907 | A1 | 12/2006 | Fox |
| 2008/0216712 | A1 | 9/2008 | Bailey et al. |
| 2008/0224345 | A1 | 9/2008 | Fox |
| 2010/0056669 | A1 | 3/2010 | Bailey |

FOREIGN PATENT DOCUMENTS

| | | |
|---|---|---|
| SU | 985095 | 12/1982 |
| SU | 1114682 | 9/1984 |
| WO | WO 2006/127683 | 11/2006 |
| WO | WO 2010/025212 | 3/2010 |

OTHER PUBLICATIONS

KR 2006023806 Mar. 15, 2006 Chun Machine Translation of Korean Patent into English.*

Sabinin et al, Derwent Acc. No. 1983-800204, "Charge for pelletizing metallurgical charge...", (1983) Abstract of SU 330850 (Aug. 14, 1981); & English Translation of Russian (USSR) Publication No. 985,095, to Sabinin et al. Published Dec. 30, 1982 (Appl. No. SU 3330851 (Aug. 14, 1981)).

Kokina et al, Derwent Acc. No. 1985-097199,"Organic-mineral cold laid road surfacing composition...", (1985) Abstract of SU 3484162 (Aug. 24, 1982).; & English Translation of Russian (USSR) Publication No. SU 1,114,682A, to Kokina et al., Published Sep. 23, 1984 (Appl. No. 3484162 (Aug. 24, 1982)).

U.S. Appl. No. 11/134,797, Dec. 14, 2005, Office Action dated Dec. 14, 2005 cited in U.S. Appl. No. 11/134,797 (Copy Attached).

U.S. Appl. No. 11/134,797, Oct. 18, 2006, Office Action dated Oct. 18, 2006 cited in U.S. Appl. No. 11/134,797 (Copy Attached).

U.S. Appl. No. 61/093,193, filed Aug. 29, 2008, Bailey.

U.S. Appl. No. 13/153,175, filed Jun. 3, 2011, Bailey.

U.S. Appl. No. 11/134,797, mailed May 31, 2006, Office Action.

U.S. Appl. No. 11/134,797, mailed Aug. 13, 2007, Notice of Allowance.

U.S. Appl. No. 11/134,797, mailed Nov. 14, 2007, Issue Notification.

U.S. Appl. No. 11/937,305, mailed Dec. 3, 2008, Notice of Allowance.

U.S. Appl. No. 11/937,305, mailed Mar. 25, 2009, Issue Notification.

Mobile Asphalt Patching: PT-SRM 10-120 Asphalt Recycler. Pavement Technologies International Corp., Accessed Jan. 2010.

NiTech Corporation Homepage. www.nitechcorp.com. Accessed Jan. 11, 2010.

Saeed, Athar and Hammons, Michael. Airfield Repairs in Austere Locations Using Pelletized Asphalt Technology. Transportation Research Board, Aug. 1, 2009.

TLA Pellet Brochure. Trinidad Lake Asphalt. Accessed Jan. 11, 2010.

TLA Pellet Brochure Overview. Trinidad Lake Asphalt. www.trinidadlakeasphalt.com/home/products/tla-pellets-brochure.html. Accessed Jan. 11, 2010.

Trinidad Lake Asphalt Homepage. www.trinidadlakeasphalt.com. Accessed Jan. 11, 2010.

* cited by examiner

PROCESS FOR PREPARING LIME PELLETS

CROSS-REFERENCE TO RELATED APPLICATIONS

This application is a continuation-in-part of U.S. patent application having Ser. No. 11/134,797, filed on May 20, 2005, entitled "PELLETING LIME FINES WITH ASPHALT ENHANCING BINDERS AND METHODS FOR USE IN ASPHALT MANUFACTURING," with William R. Bailey as the inventor, and is incorporated herein in his entirety by specific reference.

BACKGROUND OF THE INVENTION

1. The Field of the Invention

The present invention relates to lime pellets and processes for preparing the same. More particularly, the present invention relates to novel compositions and methods of manufacturing lime pellets that can be used in asphalt manufacturing and paving and/or in soil conditioning.

2. The Related Technology

Asphalt pavements are well-known and have been used for many years. Typically, an asphalt pavement includes an aggregate and asphalt cement mixed together in what is commonly referred to as hot mix asphalt (HMA). The asphalt cement is a hydrocarbon-rich substance such as, or prepared from, bitumen, and is used to bind the aggregate into a pavement. The type and amount of aggregate can vary, and it provides structural reinforcement and durability to the HMA. While the asphalt cement functions as a continuous phase that binds the aggregate materials together, it is well known that various additives such as lime can be used to improve the durability and longevity of asphalt pavements.

Traditionally, lime fines have been used in treating HMA ingredients in order to improve the long-term interactions or bonds between the asphalt cement and aggregate. Such improvements have included anti-strip characteristics and reduced deformation or softening of the asphalt pavement over time. These improvements have been obtained by either combining the lime fines with the aggregate or with the asphalt cement before the aggregate and asphalt cement have been prepared into hot mix asphalt. It is thought, without being bound thereto, that lime improves the physical characteristics of the asphalt pavement by inhibiting any absorbed water from softening the pavement, and/or by enhancing the physical interface and bonding between the aggregates and the asphalt cement.

Typically, the lime fines have been added in bulk to one of the hot mix asphalt ingredients by well-known methodologies and techniques. More particularly, the powdered lime can be supplied by marinating the aggregate in a stockpile, adding wet lime to the aggregate feed into the plant dryer, inline injection into the oil, or bulk dumping into the mixer or dryer units. While favorable asphalt pavement characteristics can be obtained by the current methodologies, problems have arisen from the lime fines clumping or becoming airborne, which jeopardizes the ability to accurately measure or control the amount of lime being used not to mention the environment.

Additionally, lime fines have been identified as a health hazard because the particulates are easily airborne and can be breathed into a person's lungs. People working directly with the lime mixing process, as well as those in surrounding areas, have been exposed to the airborne lime fines that travel throughout a processing or construction site. In part, this is because the lime fines can become airborne during transportation, loading, unloading, and while being used in the manufacturing process. When lime fines are breathed into the lungs, oxygen is depleted so as to cause suffocation or asphyxiation. While actual death can be a result of such suffocation, constant or repeated inhalation of particulate materials can have serious negative long-term implications such as emphysema, pneumonia, chronic bronchitis, and lung cancer.

Moreover, the use of lime fines to marinate the aggregate has also caused other health-related complications. This is because the powdered lime fines are usually combined with the aggregate and allowed to sit on the ground for weeks or months. As a result, the lime fines have leached into the groundwater and flowed into neighboring aquifers. The presence of lime fines in the water kills fish, and can contaminate drinking water.

Furthermore, the use of lime fines has caused problems with manufacturing and construction equipment. Again, this is at least partially a consequence of the small particulate nature of such lime fines (e.g., smaller than 200 mesh), which allows clouds of the particulates to float or circulate around construction sites and inhabited areas. The small particulates eventually deposit on the machinery or equipment and become entrained within joints and other moving parts. The particles cause excessive wear and fatigue, and result in the equipment wearing out prematurely. Specifically, problems have arisen from the lime fines being sucked into the bags of baghouses so as to foul the bags and render them unusable. Lime manufacturers admit that when 1.5% powdered lime is added by current methods that only 1% of the lime is incorporated into the finished product.

Additionally, lime has been used in soil conditioning. Lime can be used to change the pH of soil when added in proper amounts, and can stabilize the soil for various uses. As such, the use of lime in soil conditioning is well known and has been utilized for years. However, the same problems in using lime fines in manufacturing can also be problematic when used to condition soil. Thus, there is a need for a lime product that is substantially devoid of lime fines.

Therefore, it would be advantageous to have a lime product that is not a fine powder. Additionally, it would be beneficial to have a method of processing lime fines into a more manageable form so as to improve their use in asphalt manufacturing, paving and in soil conditioning with minimal health and cost concerns associated with such small particulates. Furthermore, it would be beneficial to have an improved method of preparing lime pellets that can be used with asphalt and/or in soil conditioning.

BRIEF SUMMARY OF THE INVENTION

The present invention has been developed in response to the current state of the art, and in particular, in response to problems and needs that have not been solved. Accordingly, the present invention generally includes a novel method of preparing lime pellets that eliminates traditional steps that are undertaken in preparing lime pellets. As such, the novel method can prepare lime pellets faster, cheaper, and with equal or less steps than previous methods.

In one embodiment, the present invention includes a method of manufacturing lime pellets for use in asphalt manufacturing and/or soil conditioning. Such a method includes the following: heating limestone ($CaCO_3$) to obtain quicklime ($CaO$); hydrating the quicklime with an aqueous solution to obtain hydrated lime ($Ca(OH)_2$); and pelletizing the hydrated lime into pellets that include the hydrated lime bound with a binder which may be included in the aqueous binder solution.

In one embodiment, the method of manufacturing lime pellets includes the following: obtaining crushed limestone ($CaCO_3$); heating the limestone to a temperature of at least about 825° C. to release $CO_2$ and obtain quicklime (CaO); hydrating the quicklime with an aqueous solution to obtain a suspension of hydrated lime ($Ca(OH)_2$), wherein the aqueous solution includes water and optionally a binder; and pelletizing the hydrated lime suspension into hydrated lime pellets that include hydrated lime fines bound together with the binder.

In one embodiment, the method includes crushing the limestone into a limestone powder before being heated into quicklime. Such crushing can be performed by any technique and with any equipment that can crush limestone rocks into limestone pebbles, powdered limestone, limestone fines, combinations thereof, and the like. For example, a rock crusher can be used to pulverize limestone rocks into smaller pieces of limestone, which usually includes limestone dust or fines generated from the process. Alternatively, a rock crusher can be used to pulverize the limestone rocks into a limestone powder that includes limestone fines and optionally some limestone pebbles. However, limestone fines are preferred.

In one embodiment, the method includes preparing an aqueous binder solution to include water and a binder capable of binding hydrated lime fines. Optionally, aqueous binder solution is an emulsion. The aqueous binder solution can include a hydrophobic binder and/or a hydrophilic binder. Also, the aqueous binder solution can be configured so that the pellet includes about 0.5% to about 69% binder by total weight of the pellet. For example, the binder can be selected from bitumens, tall oil pitch, both neat and modified asphalt cements, lignosulphonates, latexes, polysaccharide or derivative thereof, tannin liquor, collagen derivative, beet molasses derivative, plastomer polymers, elastomer polymers, combinations thereof, and the like. Additionally, the hydrated lime can be combined with pre-reacted granulated and/or powdered tire rubber, emulsions thereof, and additional components into the pellet, such as rheology-modifier, elastomer, plastomer, structural additive, solvent, color-imparting agent, or other additional component.

In one embodiment, the hydrating of the quicklime and pelletizing of the hydrated lime are conducted with a pelletizer system without the hydrated lime being dried or processed into a dry powder. For example, the partially hydrated quicklime fines can be provided into a rotating disc of a pelletizer, extruder, pin mixer or other pelletizing device, an aqueous binder solution can be provided (e.g. sprayed, dropped, squirted, streamed and the like) onto the quicklime fines on the pelletizing device so as to finish hydrating the quicklime into hydrated lime and form pellets from the hydrated lime fines and binder, and the pellets can be removed from the pelletizing device and dried if required. In another example, quicklime in the form of a powder can be provided into a rotating disc of a pelletizer, an aqueous solution and a binder in combination or alone, can be added onto the quicklime powder on the rotating disc or pelletizing device so as to hydrate the quicklime and form pellets, and the pellets can be removed from the rotating disc. In yet another example, quicklime in the form of a powder can be combined with an aqueous solution and a binder to form a suspension of hydrated lime in the pelletizer system, the suspension can be provided into a rotating disc of a pelletizer so as to form pellets, and the pellets can be removed from the rotating disc.

The pellets can include hydrated lime fines bound together with the binder. Also, the pellets can include some quicklime and even some limestone.

In one embodiment, the method of the present invention can prepare a lime pellet that is comprised of lime fines such as hydrated lime (e.g., calcium hydroxide or $Ca(OH)_2$) fines and/or quicklime (e.g., calcium oxide or CaO) fines, and a binder that binds the lime fines into the pellet. The lime compatible binder is mixed with the lime in an amount and disposition sufficient to form a pellet, wherein the pellet is characterized as having a substantially rigid structure with at least one dimension greater than about 1.5 mm (about 0.05 inch). The lime pellets are configured to be compatible with a hot mix asphalt and/or asphalt cement and dissolvable in liquid asphalt by selection of the binder. Also, the lime pellet can be configured to be useful for soil conditioning by selection of the binder.

In one embodiment, the present invention includes a lime pellet that is characterized to have greater than 31% lime by weight of the pellet. In yet another embodiment, the lime pellet is characterized as being capable of dissolving in liquid asphalt in less than about 5 minutes or less than about 60 seconds. In still another embodiment, the lime pellet is characterized by the binder having less than about 50% sulfur by weight of the total binder. In a further embodiment, the pellet is a storage-stable pellet that does not agglomerate with adjacent lime pellets when stored in bulk under ambient conditions. In still another embodiment, the pellet is configured to dissolve when placed in soil. In yet still another embodiment, the pellet is storage stable and slowly releases lime in the presence of moisture.

These and other embodiments and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

Figure 1:
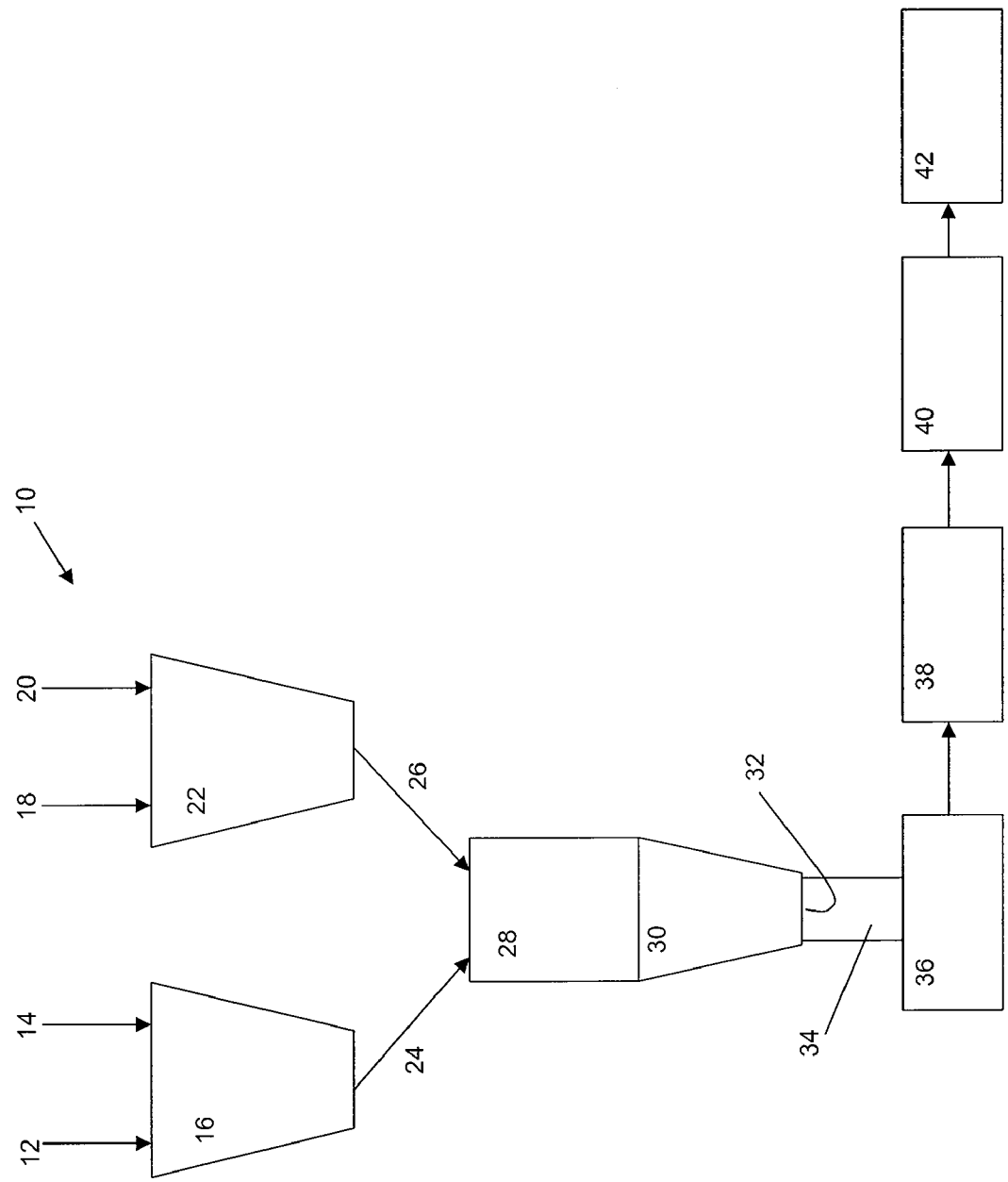
FIG. 1 is a schematic representation that illustrates an embodiment of a pelleting system and process for preparing lime pellets.

Generally, embodiments of the present invention are directed to the lime pellets, lime pellet production, and the use of lime pellets in asphalt applications and/or soil conditioning. The terminology employed herein is used for the purpose of describing particular embodiments only and is not intended to be limiting.

I. Definitions

As used herein, the term "lime" is meant to refer to calcium hydroxide ($Ca(OH)_2$) and/or calcium oxide (CaO); however, it is not meant to refer to limestone. As such, any reference to lime is meant to include compositions having calcium hydroxide or calcium oxide as well as compositions predominately comprised of calcium hydroxide or calcium oxide, whether it is dolomitic or high-calcium, and meant to specifically exclude untreated-limestone.

Accordingly, lime can be high calcium hydrated lime. High calcium quicklime produces a hydrated lime containing generally 72 to 74 percent calcium oxide and 23 to 24 percent chemically combined water. Also, the lime can be dolomitic hydrated lime (normal), whereby under atmospheric hydrating conditions only the calcium oxide fraction of dolomitic quicklime hydrates, producing a hydrated lime of the following chemical composition: 46 to 48 percent calcium oxide, 33 to 34 percent magnesium oxide, and 15 to 17 percent chemically combined water. Additionally, the lime can be dolomitic hydrated lime (pressure), whereby this lime is produced from dolomitic quicklime under pressure, which results in hydrating all of the magnesium oxide as well as all of the calcium oxide, producing the following chemical composition: 40 to 42 percent calcium oxide, 29 to 30 percent magnesium oxide, and 25 to 27 percent chemically combined water. Further, the lime can be high calcium quicklime, whereby the lime is derived from limestone containing 0 to 5 percent magnesium carbonate. Furthermore, the lime can be dolomitic quicklime, whereby the lime is derived from limestone containing 35 to 46 percent magnesium carbonate.

As used herein, the term "hydrated lime" is meant to refer to calcium hydroxide ($Ca(OH)_2$). Also, hydrated lime can be used to describe compositions that are predominately hydrated lime, but also include some limestone, quicklime, or other materials.

As used herein, the term "quicklime" is meant to refer to calcium oxide (CaO). Also, quicklime can be used to describe compositions that are predominately quicklime, but also include some limestone, hydrated lime, or other materials.

As used herein, the term "limestone" is meant to refer to mineral calcite, which is also referred to as calcium carbonate ($CaCO_3$). Limestone is not meant to refer to limes, such as quicklime or hydrated lime. Limestone includes calcium carbonate and other materials found naturally and well known to be included in limestone.

As used herein, the term "fines" is meant to refer to the small particulate nature of the lime powders of less than 80 mesh used in hot asphalt mix production. As such, the lime fines are small, finely divided, and light weight particulates that are easily airborne when handled or exposed to minimal air currents. For example, lime powders can be comprised of a majority of lime fines less than 5 microns.

As used herein, the term "storage-stable" is meant to refer to a physical characteristic that inhibits or prevents a pellet from degrading or combining with adjacent pellets under ambient conditions. That is, when under normal ambient conditions at a normal humidity, the pellets are form-stable. As such, when a plurality of storage-stable pellets are piled in storage, the individual pellets retain their distinct structural integrity without forming an agglomeration of pellets.

Concentrations, amounts, temperatures, dissolution rates, and other numerical data may be presented in a range format. It is to be understood that such a range format is used merely for convenience and brevity and should be interpreted flexibly to include not only the numerical values explicitly recited as the limits of the ranges, but also to include all the individual numerical values or sub-ranges encompassed within that range as if each numerical value and sub-range is explicitly recited. For example, bitumen can be present in the pellets as an asphalt-compatible binder at various compositions within a range of from about 5% to about 60% by dry weight. This recited range should be interpreted to include not only the explicitly recited limits of about 5% and about 60%, but also to include such individual compositional percentages such as 25%, 32%, 40%, 53%, and 59% as well as sub-ranges between these individual percentages. This interpretation should apply regardless of the breadth of the range or the characteristic being described, and should apply to ranges having both upper and lower numerical values as well as open-ended ranges reciting only one numerical value.

II. Lime Pellets

In accordance with an embodiment of the present invention, the lime pellets are prepared in a manner that binds lime fines with a lime-compatible binder. Embodiments of the methods for manufacturing lime pellets according to the present invention comprise mixing lime with a binder such as bitumen, tall oil pitch, synthetic or natural rubber (e.g. emulsified tire rubber), lignosulfonate, and the like, and subsequently forming pellets in the shape of pastilles, slates, chips, briquettes, or other small forms.

The resulting lime pellets are suitable for storage and transportation at a wide range of ambient temperatures because of their rigid and non-flow properties. The lime pellets can be stored at the production site or at a remote site and can be transported and stored in piles or within containers such as sacks, tanks, silos, and barrels.

The ability to store the lime pellets without degradation or agglomeration permits the accumulation of large quantities of pellets and shipment in large quantities to remote locations and the stockpiling thereof. The properties of the various embodiments of lime pellets according to the present invention are such that the pellets can effectively be shipped over long distances, such as by transoceanic and/or transcontinental shipments, by any one of a variety of conventional means, such as rail cars, trucks, ships, and airplanes. Properties that facilitate the storage and shipment of the inventive lime pellets in large quantities include the rigid, non-sticky, non-aggregating, and non-flow properties that enable handling without the concerns associated with lime fines or particulates becoming airborne.

In one embodiment, the individual lime pellets are storage-stable so as to not agglomerate with adjacent pellets. For example, an individual lime pellet does not substantially degrade or agglomerate with adjacent pellets for a duration longer than about 30 days, more preferably longer than about 60 days, and most preferably longer than about 90 days. Moreover, some lime pellet configurations can be form-stable for longer than about 6 months or longer than about 12 months. As such, when lime pellets are stored at normal or natural ambient conditions and humidity, the individual pellets retain their form.

Embodiments of applications suitable for using the lime pellets according to the present invention include their use in hot mix plants where the asphalt pavement end product is produced for transportation and delivery to the paving site.

Other applications of lime pellets according to the present invention include use in roadside paving operations, either alone or in combination with other paving materials. Some lime pellets can be used as soil conditioners.

Some embodiments of lime pellets according to the present invention are configured so as to protect asphalt pavement against water-induced detrimental effects, thus preventing or reducing undesirable effects that sometimes occur due to long-term exposure to the storage vessel subject to precipitation such as rain, snow, and/or ice. Also, the lime pellets can prevent or inhibit oxidative age hardening of the asphalt pavement. Some embodiments of lime pellets according to the present invention are provided with components or modifiers that provide the dark or black colored asphalt pavement that is familiar and preferred.

Also, embodiments of the lime pellets can be configured to be suitable for soil conditioning. As described above, the use of lime to condition soils is well known in the art. As such, the lime pellets can be configured to be compatible with soil so that an amount of the pellets can be applied to the soil to condition the soil without toxic side effects. That is, the lime pellets can be configured to be used on soil or in the environment similarly to how lime fines are used.

In order to achieve the foregoing properties, it can be preferred that the lime pellets have a size that prevents them from becoming easily airborne due to wind currents or handling. It has been found that when the lime pellets are at least larger than 14 mesh so as to not pass therethrough, ease of use and handling greatly increases. For example, the pellets can have a dimension greater than about 1.5 mm (about 0.05 inch) to inhibit or prevent being passed through about 14 mesh, more preferably to prevent being passed through about 8 mesh, and most preferably to prevent being passed through about 4 mesh. The lime pellets can be configured to be any size that is reasonable for the application and the size of individual pellets within a batch can vary across a broad range.

Additionally, the shape of the pellets can be varied and still retain the foregoing properties. Examples of suitable pellet shapes include those that are substantially similar to spheroids, prills, pastilles, chips, cubes, bricks, tablets, slates, chunks, irregularly-shaped pellets, and the like.

In one embodiment, the pellets can be comprised of a shell and core. As such, a binder shell is formed around the lime core. Without being bound thereto, it is thought that by decreasing the amount of binder within the pellet, there is less binder available for the external surface area of the pellet. Accordingly, the binder is distributed in a manner that preferentially encapsulates the lime so as to form a shell-core pellet. Also, the shell-core pellets can increase the dissolution rate when introduced into liquefied asphalt cement or soil. Additionally, the shell can be a coating (e.g., polyvinylalcohol, polyvinylacetate, bitumen, high temperature waxes, and the like) that increased the durability and/or storability of the pellets.

III. Lime Pellet Compositions

A. Limestone

Limestone is well known to be used as a source or starting product for preparing quicklime and hydrated lime. As such, the limestone can be provided as limestone fines that can be heated to at least 825° C. in order to produce powdered quicklime fines. Alternatively, the limestone can be provided as a limestone rock which is crushed into the limestone fines suitable for producing powdered quicklime fines. The limestone rock can be provided in any size that is suitable for being crushed or pulverized into limestone fines. The size of limestone suitable for being cooked into quicklime can be characterized as being less than about ⅛ inch, more preferably less than 1/16 inch, and most preferably less than about 1/32 inch. Also, the limestone suitable for being cooked into quicklime can be characterized as passing through about 25 mesh, more preferably about 50 mesh, even more preferably about 75 mesh, and most preferably about 100 mesh. Cooking limestone can cause the limestone to disintegrate into fines.

The limestone in powdered or rock form may include other substances. Since limestone is a natural product, the composition of limestone can vary greatly depending on geographic location and geologic conditions. Also, limestone is mined and can include a number of additional substances, such as other rocks, sands, soil, and natural substances. While any additional substance can be removed from the limestone before being cooked, these additional substances may be included with the limestone while it is being cooked if it is determined that their presence does not interfere with the production of a lime pellet for use in asphalt and/or soil conditioning applications.

Limestone is characterized as being comprised of calcium carbonate ($CaCO_3$). As such, the present invention can be practiced with calcium carbonate, and it should be understood that references to limestone are intended to include pure calcium carbonate as well as compositions of calcium carbonate and additional substances that do not interfere with the production of quicklime, hydrated lime, or the lime pellets described herein. Accordingly, the calcium carbonate can be provided in chunks or rocks that can be crushed into calcium carbonate fines.

B. Lime

In one embodiment, the pellets prepared in accordance with the present invention include calcium hydroxide ($Ca(OH)_2$). More particularly, the calcium hydroxide is presented as finely divided particulates that are held together in the pellet with a suitable binder. Calcium hydroxide is also known as calcium dihydroxide, calcium hydrate, lime hydrate, or hydrated lime. For example, the lime can be hydrated forms of quicklimes of high calcium dolomitic, hydrated forms of lime having the primary constituents CaO CaO.MgO or primary constituents $Ca(OH)_2$ $Ca(OH)_2.MgO$ $Ca(OH)_2.Mg(OH)_2$, and the like. The calcium hydroxide fines can be produced by reacting water with calcium oxide (CaO) in an atmospheric hydrator. Usually, calcium hydroxide is a white finely divided powder having an average diameter of less than about 0.15 mm so as to pass through about 100 mesh. Additionally, calcium hydroxide fines can include traces of calcium oxide, magnesium oxide, calcium sulfate, ferric oxide, and silica. Moreover, in certain instances it can be preferred that the only lime component in the pellet is calcium hydroxide so as to be substantially devoid of calcium oxide and/or limestone.

The inventive pellets can include calcium hydroxide in a variety of concentrations. In fact, some embodiments can include calcium hydroxide up to about 99% by weight of the pellet. For example, the pellets can include calcium hydroxide from about 1% to about 99%, more preferably from about 10% to about 90%, even more preferably from about 31% or 35% to about 85%, and most preferably from about 45% to about 75% by total weight of the pellet. A specific example of an inventive pellet includes calcium hydroxide at greater than 31% by total weight of the pellet.

In one embodiment, the pellets prepared in accordance with the present invention include calcium oxide (CaO). More particularly, the calcium oxide is presented as finely divided particulates that are held together in the pellet with a suitable binder. Calcium oxide is also known as calcium monoxide, quicklime, or burnt lime, and may have primary constituents CaO or CaO.MgO. Usually, calcium oxide is a white or slightly yellowish finely divided powder. Additionally, calcium oxide fines can include traces or small amounts of magnesium oxide, ferric oxide, and silicon oxide. Calcium oxide is a basic anhydride, and reacts with water to form calcium hydroxide. Moreover, in certain instances it can be preferred that the only lime component in the pellet is calcium oxide so as to be substantially devoid of calcium hydroxide and/or limestone. The inventive pellets can include calcium oxide in a variety of concentrations including those similar to calcium hydroxide.

Additionally, in some embodiments and/or applications it can be preferred to have lime pellets that are comprised of both calcium hydroxide and calcium oxide. This enables the pellets to provide the benefits of both chemicals to the asphalt pavement and/or soil. More particularly, when calcium oxide and calcium hydroxide are included in the pellets, the calcium hydroxide can impart enhanced anti-strip and improved aggregate-asphalt cement bonding, and the calcium oxide can interact with any absorbed water in order to yield additional calcium hydroxide. Also, it can be economically favorable for the hydration reaction that converts quicklime to hydrated lime to be incomplete so that some amount of quicklime remains. Allowing some amount of quicklime to remain and be included in the pellets can enable the pellets to be prepared with novel methods as described herein. Moreover, when the pellets are configured to be used as a soil conditions, some quicklime can be advantageous because it can convert to hydrated lime when exposed to moisture in the soil. Accordingly, the inventive pellets can include lime in a variety of concentrations such as those recited for calcium hydroxide.

In one embodiment, it can be economically favorable to prepare lime pellets that additionally include some limestone. This can be favorable so that the reaction process that converts limestone into quicklime can be conducted until some amount of limestone is converted to quicklime; however, some amount of limestone is retained. Preferably the majority of the pellets include lime, and any limestone is present in a minor amount. Also, some amount of limestone can be included in the pellets because the limestone may not substantially affect the asphalt and/or soil. Additionally, it is thought that some amount of limestone may be beneficial for asphalt and/or soil conditioning applications.

In one embodiment, it can be preferred for the lime pellets to be substantially devoid of limestone. While some applications can allow for the lime pellets to include some amount of limestone, there are other applications where it may be preferred that the lime pellets are substantially devoid of limestone. For example, an asphalt manufacturing protocol may be utilized where it is undesirable to have limestone in the lime pellets because of the intended use of the lime pellets. Also, lime pellets for use in soil conditioning may be preferred to be substantially devoid of limestone.

C. Binder

Generally, an embodiment of a lime pellet in accordance with the present invention includes a lime-compatible binder. By being "lime-compatible," it is meant to include any binder that can bind lime into a pellet for use in asphalt and/or soil conditioning without the binder unfavorably altering the characteristics of the lime. As such, the binder does not impart any or significant detrimental characteristics to the lime so as to undermine the use of such a pellet. A wide range of lime-compatible binders can be employed which include hydrophobic binders (e.g., oil-based, rubber-based, and polymer-based binders), hydrophobic/hydrophilic binders (e.g., binders having a hydrophobic portion and a hydrophilic portion), and hydrophilic binders (e.g., lignin-based binders). Some embodiments can include as little as about 0.5% binder by total weight of the pellet. For example, the pellets can include binder from about 1% to about 99%, more preferably from about 10% to about 90%, even more preferably from about 5% to about 80%, and most preferably from about 25% to about 69% or 70% by total weight of the pellet, or any amount less than 69% by weight.

In one embodiment, the binder is comprised of bitumen. Bitumen is a generic term referring to a flammable mixture of various hydrocarbon materials derived naturally or by distillation from petroleum. Usually, bitumen has a dark brown or black color, and can be present in forms that range from sticky and/or viscous oils to brittle solids such as asphalt, tars, and natural mineral waxes. Examples of substances containing bitumen include bituminous coal, tar, pitch, or Engen Bitumen 110-2™ (Engen Petroleum Limited; South Africa). When used, the pellets can include bitumen at general binder concentrations, or at a concentration ranging from about 10% to about 75%, more preferably from about 20% to about 69% or 70%, and most preferably about 25% to about 60% by total weight of the pellets. A specific example includes bitumen at 50% by total weight.

While bitumens can include elemental sulfur, it can be preferred that the binder does not include any additional sulfur such as elemental or unprocessed sulfur. For example, it can be preferred that the binder includes sulfur in an amount less than about 50% by weight of total binder, more preferably less than about 25% by weight of total binder, less than 20%, and most preferably with no sulfur added to the binder.

In another embodiment, the binder can be an asphalt cement. As such, examples of such asphalt cements are commonly abbreviated with the terms AC-xx. The notation "xx" in the description of AC asphalt represents a numeral related to the asphalt viscosity. Asphalts such as AC-20 and AC-10 are the preferred forms to be used as binders. Other forms of asphalt that are contemplated as constituents in binder formulations include AC-1.75, AC-2.5, AC-5, AC-30, AC-40, AC-80, and AC-120 asphalts. Also, the super pave grading system "PG-xx-xx" (e.g., PG-76-22) can be used to identify asphalt oils, wherein the "xx" notations designate temperatures in Celsius for the performance grade.

Additionally, other hydrocarbon-based materials can be used to bind lime fines. Examples of some hydrocarbon-based materials include heavy crude oil, fuel oil, tall oil pitch, and the like. Also, these materials can be added as constituents in asphalt cement formulations or bitumen compositions. For example, when tall oil pitch is used it can bind the lime fines at about 0.5% to about 20% by weight of the pellet.

In one embodiment, the binder is rubber. Examples of rubbers can include natural and synthetic rubbers. Also, the rubber can be obtained from tire rubber. Such tire rubber can be ground up into particles and emulsified. Additionally, the tire rubber can be pre-reacted into a sticky composition that is suitable for agglomerating lime fines. Similarly latex rubber can also be used in both the natural and synthetic forms.

In one embodiment, the binder can be a hydrophobic polymer. As such, the hydrophobic binder can be polymer comprised of acrylic acids, methacrylic acids and copolymers, methyl methacrylate copolymers, ethoxyethyl methacrylates, cyanoethyl methacrylate, aminoalkyl methacrylate copolymer, poly(acrylic acid), poly(methacrylic acid), methacrylic acid alkylamide copolymer, poly(methyl methacrylate), poly (methacrylic acid) (anhydride), methyl methacrylate, poly-methacrylate, poly(methyl methacrylate), poly(methyl methacrylate) copolymer, polyacrylamide, aminoalkyl methacrylate copolymer, poly(methacrylic acid anhydride), glycidyl methacrylate copolymers, polyolefins, silicones, polypropylenes, polyethylenes, acrylic polymers, polystyrenes, polyethylene-vinyl acetate, polyethylene vinyl alcohol, polyethylene acetate, polyvinylpyrrolidones, chlorinated polyethylenes, polyisoprenes, polybutadienes, styrene-butadiene di- and tri-block polymers, polychloroprenes, polyethylene-propylenes, chlorosulfonated polyethylenes, polyurethanes, styrene isoprene polymers, styrene ethylbutylene polymers, styrene butadiene rubber latex, other rubbers, polychloroprene latex, polymethylmethacrylate, polyethylmethacrylate, polydimethylsiloxanes, and the like.

In one embodiment, the binder is a hydrophobic cellulosic material such as ethylcellulose. Those skilled in the art will appreciate that other cellulosic polymers, including other alkyl cellulosic polymers, may be substituted for part or all of the ethylcellulose included in the hydrophobic polymer portion of the multiparticulates of the present invention. Also, the binder can be hydroxyalkylcelluloses such as hydroxypropylmethylcellulose and mixtures thereof.

In one embodiment, the binder can be an organic binder. Examples of organic binders include polyolefins, silicones, acrylics, latexes, waxes, oils, greases, plasticizers, lignosulfonates, polysaccharides, celluloses and derivatives thereof, starches and derivatives thereof, other natural polymers (e.g., proteins), natural and synthetic rubbers, and the like.

In one embodiment, the binder is a hydrophilic binder. Hydrophilic binders are characterized as being compatible with water systems, and thereby can be used in soil applications, and may be useful for asphalt applications. Hydrophilic binders can be polymeric and can include hydrophilic monomers. Examples of hydrophilic binders include polyethylene glycol, polyetheleneimine, polylysine, polysaccharides, and the like.

In one embodiment, the binder is a biodegradable polymer. For example, the biodegradable polymer composition can include poly(alpha-hydroxy esters), polylactic acids, polylactides, poly-L-lactide, poly-DL-lactide, poly-L-lactide-co-DL-lactide, polyglycolic acids, polyglycolide, polylactic-co-glycolic acids, polyglycolide-co-lactide, polyglycolide-co-DL-lactide, polyglycolide-co-L-lactide, polyanhydrides, polyanhydride-co-imides, polyesters, polyorthoesters, polycaprolactones, polyesters, polyanydrides, polyphosphazenes, polyester amides, polyester urethanes, polycarbonates, polytrimethylene carbonates, polyglycolide-co-trimethylene carbonates, poly(PBA-carbonates), polyfumarates, polypropylene fumarate, poly(p-dioxanone), polyhydroxyalkanoates, polyamino acids, poly-L-tyrosines, poly(beta-hydroxybutyrate), polyhydroxybutyrate-hydroxyvaleric acids, combinations thereof, or the like.

In one embodiment, the binder is a natural polymer that can be derived from a natural source. Natural polymers can include polysaccharides, proteins, and the like. Examples of some suitable polysaccharides include methylhydroxyethylcellulose, hydroxymethylethylcellulose, carboxymethylcellulose, methylcellulose, ethylcellulose, hydroxyethylcellulose, hydroxyethylpropylcellulose, amylopectin, amylose, seagel, starches, starch acetates, starch hydroxyethyl ethers, ionic starches, long-chain alkylstarches, dextrins, amine starches, phosphate starches, and dialdehyde starches, alginic acid, phycocolloids, agar, gum arabic, guar gum, locust bean gum, gum karaya, gum tragacanth, poultry eggs, blood, and the like.

In one embodiment, the binder is comprised of lignin and/or lignosulfonate or acid thereof. Lignin is a wood constituent that is modified in a sulfite pulping process in order to obtain lignosulfonate. When used as a binder, the lignin and/or lignosulfonate can be used at the general binder compositions, or at any concentration less than about 99% by weight or greater than about 0.5% by weight, more preferably from about 0.75% to about 50%, even more preferably from about 1% to about 20%, and most preferably from about 1.25% to about 10% by weight.

In one embodiment, the binder can include a polysaccharide or modified polysaccharide. It has now been found that such polysaccharides or modified polysaccharides can be used as lime binders. Examples of polysaccharide or modified polysaccharide binders include starch, gelatinized starch, celluloses such as carboxymethylcellulose, and liquid modified starches obtained from mashing and brewing processes such as Brewex™ (Mars Mineral; Mars, Pa.).

In another embodiment, tannin liquor compositions can be used as the lime binder. Such tannin liquors can be obtained from processes used to convert animal skin into leather, but can also include large polyphenolic compounds. For example, a tannin liquor can include a vegetable tannin such as TAC™ (Mars Mineral; Mars, Pa.).

In another embodiment, collagen or collagen derivatives can be used as the lime binder. Such collagen derivatives particularly suitable for preparing lime pellets can be obtained from leather production waste, wherein the collagen or derivative thereof has been reduced to polypeptides. For example, the collagen derivatives can include Collagen $CH_2$™ (Mars Mineral; Mars, Pa.).

In another embodiment, a beet molasses derivative can be used as the lime binder. Usually, such a beet molasses derivative has a reduced sugar content, as the sugar has been previously extracted. An example of such a reduced-sugar beet molasses is Molex™ (Mars Mineral; Mars, Pa.).

In one embodiment, latex can be used as a lime and/or used as an adhesive additive. In part, the benefits arise from the composition of latex, which includes an emulsion of a synthetic rubber or plastic obtained by polymerization. Also, the benefits may be realized for the same reasons latex is used in coatings, paints, and adhesives. When used as a binder, latex can be used within the general binder concentrations. In asphalt applications, latex can be used at less than about 30% by weight of the pellet, more preferably less than about 20% by weight, and most preferably less than 10% by total weight. In soil applications, latex can be used at less than about 3% by weight of the pellet, more preferably less than about 2% by weight, and most preferably less than about 1% by total weight.

In some instances it can be preferred that a certain polymer is used as a binder and/or adhesive additive. Some polymers have been previously used as asphalt additives or conditioners, and are typically classified as elastomers or plastomers. It has now been found that such polymers can be used as lime binders so as to provide a pellet. Also, such polymers can be used in low quantities for binding lime into pellets for use in soil applications. Elastomers include copolymers of styrene and butadiene, styrene-butadiene diblock, styrene-butadiene-styrene triblock or radial, styrene isoprene, styrene ethylbutylene, styrene butadiene rubber latex, polychloroprene latex, polyisoprene, and crumb rubber modifier. Plastomers include polyethylene vinyl acetate, polyethylene vinyl alcohol, polyethylene acetate, polyethylene and its derivatives, and various compounds based on polypropylene. Additionally, other types of polymers that can be used include acrylic polymers such as polymethylmethacrylate and polyethylmethacrylate, silicon-based polymers such as polydimethylsiloxane, and the like. When used as a binder, a polymer can be used at the general binder concentrations. These polymers may also be used as coatings. In asphalt applications, a polymer can be used at less than about 30% by weight of the pellet, more preferably less than about 20% by weight, and most preferably less than 10% by total weight. In soil applications, a polymer can be used at less than about 3% by weight of the pellet, more preferably less than about 2% by weight, and most preferably less than about 1% by total weight.

Further, various other compounds can be used as, or with, lime-compatible binders. Bentonite clay and vermiculite in solution can also be used as binders. Accordingly, adhesive additives can either be used as the binder or an additive. Some examples of such adhesive additives include high temperature silicones, which are stable at high temperatures. These materials can bind lime into pellets, or complement another binder such as bitumen. Also, silicone-based polymers, methyltrimethoxysilane, and trimethoxysilyl compounds can be similarly used.

Additionally, various combinations of the foregoing binders can be employed in manufacturing a lime pellet. As such, the properties provided by different properties can be combined so as to form a lime pellet that is compatible with asphalt, and can improve the physical properties thereof.

The binders can also be included in binder liquids, emulsions, and/or suspensions. The binder emulsions can be prepared to include cationic or anionic asphalt emulsions, sugar emulsions, starch emulsions, organic emulsions, soy emulsions, lard emulsions, clay emulsions, and the like. The binder liquids can be prepared by any process to liquefy the binder. Binder suspensions can be prepared by suspending the binder in a liquid such as water or another solvent. In any event, any of the binders can be prepared into binder liquids, emulsions, and/or suspension with or without water or other solvent.

D. Solvents

In one embodiment, it can be beneficial to use a solvent during the manufacture of the lime pellets. The solvent can be used for providing the binder or for enhancing the interactions between the lime and binder or the pellets chemical interface with the asphalt oil/aggregate. Also, the solvents can be used in order to suspend the binder or other ingredients so as to enhance its handling and processing ability. For example, it can be beneficial to pre-treat the powdered lime with a solvent so that the problems associated with airborne particulates can be avoided. In another example, it can be beneficial to mix the binder and additives into the solvent for delivery to the lime. Some solvents are trained in the pellets after being manufactured.

When the binder is hydrophilic or water-soluble, it can be beneficial to suspend or dissolve the binder in water or other aqueous solvent so that it can be thoroughly and homogeneously combined with the lime fines. However, water can also be used with hydrophobic binders in preparing emulsions and/or suspensions. Also, water or aqueous solvent can provide a medium for transporting and handling the lime fines so as to prevent or limit the problems associated with such fine particulates. After adequate mixing, water can be blown off or evaporated so that the binder-lime mixture can be further processed. Additionally, the water can be used to hydrate the quicklime into hydrated lime before, during, or after the lime is intermingled with the binder.

When the binder is hydrophobic, it can be beneficial to suspend or dissolve the binder and/or lime in a hydrophobic solvent. The hydrophobic solvent can be favorable and useful for hydrophobic binders as water is useful for with hydrophobic binders. However, hydrophobic solvents may need to be utilized in combination with a water treatment in order to hydrate the quicklime into the hydrated lime. As such, the hydrophobic solvent can be combined with water, or can be provided separately from water.

In some instances, it can be beneficial for the solvent to include an organic solvent. This can facilitate combining the binder with the lime during some of the various methods for manufacturing the lime. In some instances, portions of the organic solvent can be retained in the pellet as an additional conditioner or plasticizer for the binder. Otherwise the organic solvent can be blown off, especially when a volatile solvent such as ethanol or isopropanol is used. Some examples of organic solvents include toluene, hexane, aliphatic petroleum distillate, alicyclic hydrocarbons, aromatic hydrocarbons, standard solvents, acetone, ethanol, isopropanol, and the like.

Additionally, the solvents can be comprised of detergents and/or surfactants that alter the surface tension and can allow for enhanced interaction of the binder and lime particles. Accordingly, a detergent and/or surfactant can be selected based on the properties of the primary solvent and/or binder. That is, aqueous solvents can be used with some detergents and/or surfactants, and non-aqueous solvents may be used with the same or different detergents and/or surfactants. The process of selecting detergents and/or surfactants based on the solvent and other components (e.g., lime) is well known to be based on the properties of the substances to be included in the composition as well as the desired properties of the resulting composition.

E. Additives

The lime pellets in accordance with the present invention can include a variety of additional additives for asphalt or soil conditioning applications. One such additive can include a structural additive such as sand, silica, fly ash, ceramic particles, glass particles, clay particles, pozzolanic materials, anti-stripping agents, fertilizer, nutrients filler materials, and the like. Accordingly, lime pellets that are prepared for use in asphalt applications can include additives that are customarily included in asphalt and/or asphalt products. Similarly, the lime pellets that are prepared for use in soil conditioning applications can include additives that are customarily included in soil conditioning products.

Another type of additive includes an agent that can impart a color to the lime pellet. For example, carbon black and/or manganese oxide can be included so as to impart a dark or black color to a pellet that is configured for use with asphalt. On the other hand, green dyes or pigments can be used to color the lime pellets green for use on grass, and a brown colorant can be used for soil.

An additional type of additive includes salts which can interact with many of the components in the lime pellet and enhance the long-term characteristics of the pellet, asphalt pavement, and/or soil. In fact, some of the salts can act to enhance the binders when processed with the lime fines. Examples of such salts include sodium chloride, calcium chloride, potassium chloride, magnesium sulfate, manganese dioxide, manganese oxide, and the like. The salt additive can be present at a concentration ranging from about 0.1% to about 20% by weight, more preferably from about 0.25% to about 15%, and most preferably from about 0.5% to about 10% by weight.

In order to change the rheology of the compositions that are used in preparing the lime pellet, a rheology-modifier can be used. When a shear force is applied to a composition having a rheology-modifier, it can behave in a non-Newtonian manner so that the viscosity decreases by the applied force. This can be beneficial for homogeneously distributing fines throughout a composition during the mixing, and then inhibiting or decreasing the settling of the fines after the composition is allowed to set. Also, rheology-modifiers can be lime binders. Examples of such rheology-modifiers include polysaccharides such as caroboxymethylcellulose, other celluloses, amyloses, inulins, chitins, chitosans, amylopectins, glycogens, pectins, hemicelluloses, glucomannans, galactoglucomannans, xyloglucans, methylglucuronoxylans, arabinoxylans, methylglucuronoarabinoxylans, glycosaminoglycans, chondroitins, hyaluronic acids, alginic acids, and the like.

In instances a polymer is used as a binder, adhesive, or other additive in the lime pellets, a plasticizer can be used to enhance the characteristics of the pellet. Examples of suitable plasticizers include water-insoluble plasticizers such as dibutyl sebacate, diethyl phthalate, triethyl citrate, tributyl citrate, triacetin, acetylated monoglycerides, phthalate esters, castor oil, dibutyl phthalate, 1,2-propylene glycol, polyethylene glycols, propylene glycol, and the like.

IV. Manufacturing Lime Pellets

The present invention includes manufacturing lime pellets for use in asphalt manufacturing and/or soil conditioning. Such manufacturing includes the following: heating limestone ($CaCO_3$) to obtain quicklime (CaO); hydrating the quicklime with an aqueous binder solution to obtain hydrated lime ($Ca(OH)_2$); and pelletizing the hydrated lime into pellets that include the hydrated lime bound with the binder of the aqueous binder solution.

In one embodiment, the method of manufacturing lime pellets for use in asphalt manufacturing and/or soil conditioning includes the following: heating limestone ($CaCO_3$) to obtain quicklime (CaO); hydrating the quicklime with an aqueous solution to obtain hydrated lime ($Ca(OH)_2$) mixture that includes water; and pelletizing the hydrated lime mixture into pellets that include the hydrated lime bound with a binder, wherein the hydrated lime is not dried or converted to a powder prior to the pelletizing with the binder.

In one embodiment, the method of manufacturing lime pellets for use in asphalt manufacturing and/or soil conditioning includes the following: obtaining crushed limestone ($CaCO_3$) fines; heating the limestone fines to a temperature of at least about 825° C. to release $CO_2$ and obtain quicklime (CaO) fines; hydrating the quicklime fines with an aqueous solution to obtain a suspension of hydrated lime ($Ca(OH)_2$) fines; binding the hydrate lime fines in the hydrated lime suspension with a binder; and pelletizing the hydrated lime suspension into hydrated lime pellets that include hydrated lime fines bound together with the binder.

In one embodiment, the hydrating can be performed with pure or substantially pure water, and the binder can be added separately. This can include the water hydrating the quicklime into hydrated lime before the binder is included, or the binder can be added while the hydration reaction is converting the quicklime to hydrated lime. As such, the duration between adding the water and binder can be modulated to obtain varying degrees of hydration, such as partial through full hydration. Also, the water can continue to hydrate the lime after being bound by the binder.

In one embodiment, the method of manufacturing lime pellets includes the following: obtaining crushed limestone ($CaCO_3$); heating the limestone to a temperature of at least about 825° C. to release $CO_2$ and obtain quicklime (CaO); hydrating the quicklime with an aqueous solution to obtain a suspension of hydrated lime ($Ca(OH)_2$), wherein the aqueous solution includes water and a binder; and pelletizing the hydrated lime suspension into hydrated lime pellets.

In one embodiment, the method includes crushing the limestone into a limestone powder before being heated into quicklime. Such crushing can be performed by any technique and with any equipment that can crush limestone rocks into limestone pebbles, powdered limestone, limestone fines, combinations thereof, and the like. For example, a rock crusher can be used to pulverize limestone rocks into smaller pieces of limestone, which usually includes limestone dust or fines generated from the process. Alternatively, a rock crusher can be used to pulverize the limestone rocks into a limestone powder that includes limestone fines and optionally some limestone pebbles; however, limestone fines are preferred.

In one embodiment, the method includes cooking the limestone into quicklime within a heating apparatus. Limestone is known to be converted into quicklime by being cooked at temperatures of about 825° C. or a temperature that drives off the carbon gas so that calcium oxide is formed. However, it can be beneficial to heat the limestone to at least about 875° C., preferably to at least about 900° C., more preferably to at least about 950° C., and most preferably to at least 1000° C. These higher temperatures can help drive off other substances so as to obtain quicklime that has less additional substances contained therein.

In one embodiment, the method includes preparing the aqueous binder solution to include water and a binder capable of binding hydrated lime fines. Optionally, aqueous binder solution is an emulsion, suspension, immiscible liquid, or the like. The aqueous binder solution can include a hydrophobic binder and/or a hydrophilic binder. Also, the aqueous binder solution can be configured so that the pellet includes about 0.5% to about 69% binder by total weight of the pellet. For example, the binder can be selected from bitumens, tall oil pitch, asphalt cements, lignosulphonates, latexes, polysaccharide or derivative thereof, rubbers, pre reacted rubbers, emulsified rubbers, grooved tire rubbers, tannin liquor, collagen derivative, beet molasses derivative, plastomer polymers, elastomer polymers, combinations thereof, and the like.

Additionally, the aqueous binder solution can be prepared into an emulsion. As such, the binder can be admixed with water and emulsified. The emulsion can be prepared with the binder being present at about 30% to about 90% by weight, more preferably about 40% to about 80%, and most preferably about 55% to about 70% by weight with the balance being a solvent (e.g., oil, alcohol, aqueous solution, or substantially pure water). The emulsion can be prepared with traditionally hydrophobic binders (e.g., bitumen, SS-1h, hard base bitumen, small amounts of sulfur or sulfur emulsions, polymers, styrene-butadiene, SBS, rubbers, ground tire rubbers, and the like), plasticizers, and other polymers.

In one embodiment, a primary emulsion comprised of a binder and solvent can be diluted with water to form the aqueous binder solution. This can include diluting the primary emulsion with at least about 25% more water, more preferably at least about 50% more water, and most preferably at least about 60% more water.

Additionally, the lime can be combined with an additional component into the pellet, such as rheology-modifier, elastomer, plastomer, structural additive, solvent, color-imparting agent, or other additional component. As such, the lime can be combined with additional components before, during, and after being bound with the binder. As such, the pellet can include additional components being intermingled with the lime within the pellet and/or the additional components can be bound to the outside of the pellet or formed into a shell with respect to the lime or vice versa.

In one embodiment, the hydrating of the quicklime and pelletizing of the hydrated lime are conducted with a pelletizer system. For example, the quicklime fines can be provided into a rotating disc of a pelletizer, the aqueous binder solution can be provided onto the quicklime fines on the rotating disc so as to hydrate the quicklime and form pellets, and the pellets can be removed from the rotating disc. In another example, quicklime in the form of a powder can be provided into a hydrolizer and wetted with water (e.g., 20%) then blown dry in a drying tower, and added to the rotating disc of a pelletizer, an aqueous solution can be added onto the quicklime (e.g., fully hydrated, semi-hydrated or partially hydrated) powder on the rotating disc so as to hydrate the quicklime and form pellets with the binder, and the pellets can be removed from the rotating disc. In yet another example, quicklime in the form of a powder can be combined with the aqueous solution to form a suspension of hydrated lime in the pelletizer system, the suspension can be provided into a rotating disc of a pelletizer so as to form pellets, and the pellets can be removed from the rotating disc. The pellets can include hydrated lime fines bound together with the binder. Also, the pellets can include some quicklime and even some limestone. Similar methodologies can be employed in other types of pelletizer systems, such as in pan pelletizers, pin mixer pelletizers, extruder-type pelletizers, and the like.

The aqueous solution and/or binder can be added to the lime fines by spraying, soaking, squirting, streaming, dripping, and the like. Any of the processes can be performed before, during, or after the lime fines are added to the pelletizer or rotating disc of the pelletizer. Also, the aqueous solution and binder can be added separately, together, or intermittently, or continuously.

In one embodiment, the heating and hydrating can be conducted in the same apparatus. As such, a heater, mixer, container, or combination thereof can be configured for cooking the limestone into quicklime fines and then receiving water so as to hydrate the quicklime into hydrated lime. This can greatly simplify the process of the invention. Traditionally, quicklime fines are processed, dried, removed, and stored before being converted into hydrated lime, and the hydrated lime can be handled similarly before being pelleted. The present invention provides for preparing the quicklime, hydrated lime, and lime pellets in the same system so that the problems associated with dry powdered quicklime and/or hydrated lime fines is diminished. By employing a system for the process described herein the problems with handling lime fines can be reduced because the fines are either processed without being moved between sites or processed within a continuous system.

In one embodiment, the method of the present invention can prepare a lime pellet for use in asphalt manufacturing and/or soil conditioning. The pellet is comprised of lime fines such as hydrated lime (e.g., calcium hydroxide or $Ca(OH)_2$) fines and/or quicklime (e.g., calcium oxide or CaO) fines, and binder that binds the lime fines. The lime-compatible binder is mixed with the lime in an amount and disposition sufficient to form a pellet, wherein the pellet is characterized as having at least a substantially rigid structure with at least one dimension greater than about 1.5 mm (about 0.05 inch). The lime pellet can be configured to be compatible with a hot mix asphalt and/or asphalt cement and dissolvable in liquid asphalt by selection of the binder. Also, the lime pellet can be configured to be useful for soil conditioning by selection of the binder.

In one embodiment, the present invention includes a lime pellet that is characterized to have greater than about 31% lime by weight of the pellet. In yet another embodiment, the lime pellet is characterized as being capable of dissolving in liquid asphalt in less than about 5 minutes or less than about 60 seconds. In still another embodiment, the lime pellet is characterized by the binder having less than about 50% sulfur by weight of the total binder. In a further embodiment, the pellet is a storage-stable pellet that does not agglomerate with adjacent lime pellets when stored in bulk under ambient conditions. In still another embodiment, the pellet is configured to dissolve when placed in soil. In yet still another embodiment, the pellet is storage stable and slowly releases lime in the presence of moisture.

FIGS. 1-4 illustrate various schematic diagrams of embodiments of processing systems and equipment that can be used during the formation of a lime pellet. It should be recognized that these are only examples or schematic representations of processing systems and equipment, and various modifications can be made in order to prepare the inventive pellets. Also, the schematic representations should not be construed in any limiting manner to the arrangement, shape, size, orientation, or presence of any of the features described in connection with the figures. With that said, a more detailed description of examples of some of the systems and equipment that can prepare the lime pellets is provided below.

FIG. 1 depicts an embodiment of a pelleting system 10 in accordance with the present invention. Such a pelleting system 10 includes a first mixer 16, second mixer 22, extruder 28, dye head 30, cooler or dryer 36, pelletizer 38, conditioning apparatus 40, and pellet collector 42.

The first mixer 16 is configured to receive a first feed of materials through a first feed line 12 and a second feed of materials through a second feed line 14. The first mixer 16 processes the materials supplied by the first line 12 and second line 14 into a first mixture 24. Similarly, an optional second mixer 22 has a third feed line 18 and a fourth feed line 20 that supplies the material to be mixed into a second mixture 26. The first mixer 16 and/or the second mixer 18 can be configured for variable speed and shear mixing at elevated temperatures.

For example, the first feed line 12 can supply the lime fines with or without a solvent, and the second feed line 14 can supply the binder (such as bitumen) with or without an organic solvent that can be sprayed onto or otherwise combined with the lime. Additionally, the third feed line 18 can supply the lime fines with or without a solvent, and the fourth feed line 20 can supply the binder (such as SBS) with or without a solvent. The second mixer 22 is optional because it can be preferable to prepare lime pellets with only quicklime or hydrated lime. Additionally, other processing schemes can render the second mixer as optional.

Additionally, the first mixture 24 and the second mixture 26 are supplied into the extruder 28, and mixed into a composition capable of being extruded. Additionally, while being mixed, the composition can be moved through the extruder 28 so as to pass by heating elements (not shown). The heating elements can provide for a ramped increase or parabolic change in temperature in order to gradually remove the solvents and/or increase the liquidity of the binder before extrusion.

As the composition moves to the end of the extruder 28, it passes through the die head 30 before being extruded through the die opening 32. The die head 30 and die opening 32 can be configured into any shape or arrangement so long as to produce a pelletable extrudate 34. In another embodiment, the extrudate 34 can itself form pellet-sized spheroids by having a plurality of die openings 32 in the die head 30.

In some instances when the extrudate 34 leaves the die opening 32, it can be too moist to be pelleted. As such, it can be beneficial to dry the extrudate 34 in an optional dryer 36 before being pelleted to remove any solvent. The dried extrudate can have a moisture content below about 15%, more preferably below about 10%, and most preferably below about 5% before being pelleted.

Accordingly, the pellets can be dried by air drying or with a mechanical dryer. The mechanical dryer can be any drying apparatus configured to use heat to remove moisture, such as a continuous flow rotary dryer or the like. The drying temperature can be at least about 100° C., preferably at least about 150° C., more preferably at least about 200° C., and most preferably at least about 250° C.

On the other hand, the extrudate 34 may be at an elevated temperature from the extruding process so as to have thermoplastic characteristics (i.e., being in a flowable or gummy state). As such, it can be beneficial to cool the extrudate 34 before pelleting. For example, the extrudate can be cooled to a temperature of less than 35° C., more preferably a temperature less than 30° C., and most preferably less than 25° C. in the cooling apparatus 36 before being pelleted.

After the extrudate 34 is dried or cooled, it is supplied to the pelletizer 38. The pelletizer 38 can be configured for cutting the extrudate 34 into a variety of shapes and sizes. For example, the extrudate 34 can be cut into pellets having a diameter range from about 1.5 mm (about 0.05 inches) to about 2.54 cm (about 1 inch), more preferably in a range of from about 2 mm (about 0.08 inches) to about 2 cm (about 0.8 inches), even more preferably about 3 mm (about 0.1 inches) to about 1.5 cm (about 0.6 inches), and most preferably in a range of from about 6 mm (about 0.2 inches) to about 1 cm (about 0.4 inches).

The pellets can then be supplied from the pelletizer 38 to an optional conditioning assembly 40, which can condition the pellets for storage in a pellet collector 42, or for further processing. For example, the conditioning assembly 40 can be configured to harden the pellets, apply a water-resistant coating such as a water-resistant polymer or a wax, or apply a lubricious coating so as to reduce the friction between the pellets. Also, any of the equipment for use in processing the pellets can be combined together for simplicity.

Figure 2:
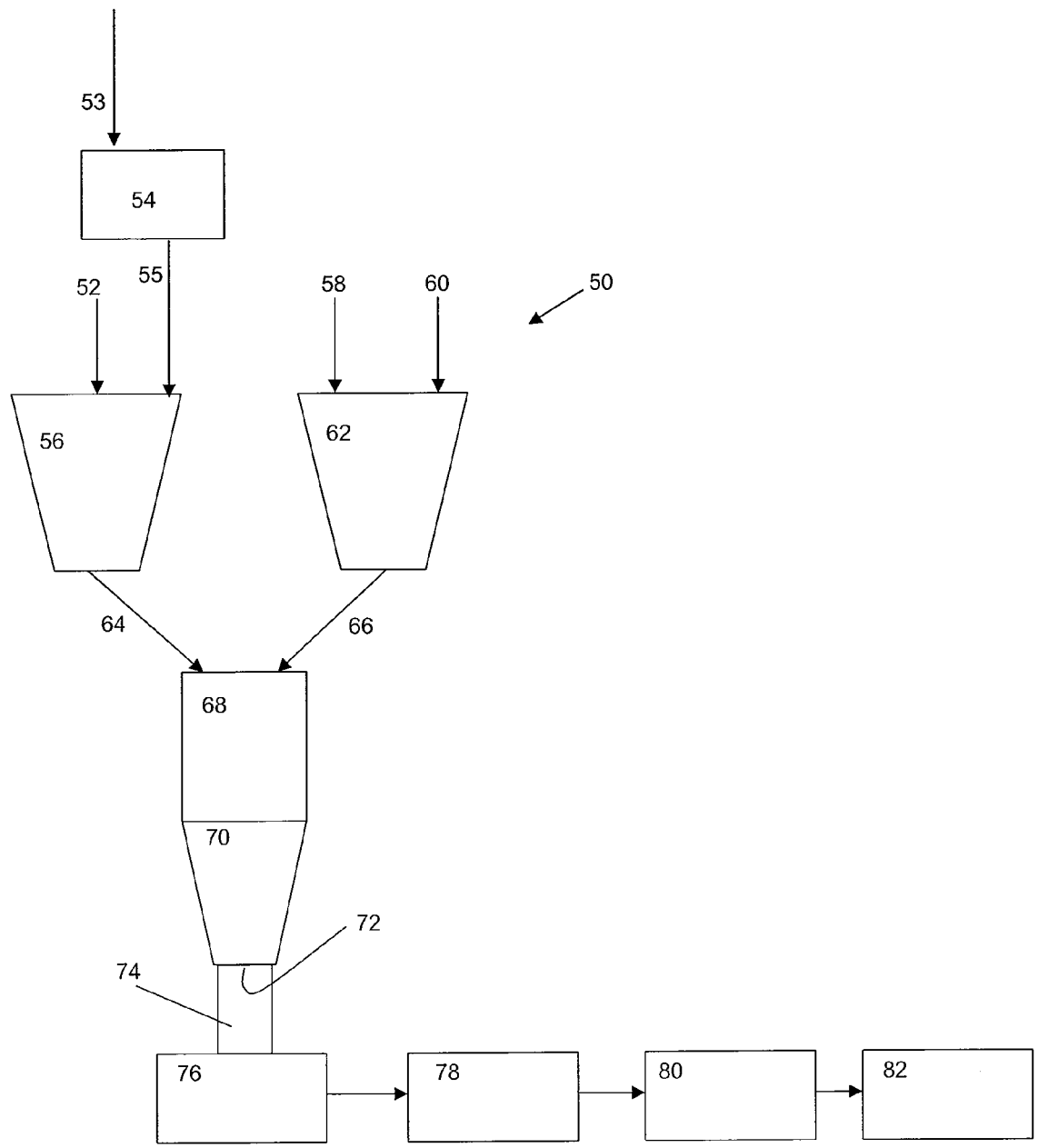
FIG. 2 is a schematic representation that illustrates an embodiment of a pelleting system and process for preparing lime pellets.

FIG. 2 depicts an embodiment of a pelleting system 50 in accordance with the present invention. Such a pelleting system 50 includes a heater 56, optional rock crusher 54, mixer 62, extruder 68, dye head 70, cooler or dryer 76, pelletizer 78, conditioning apparatus 80, and pellet collector 82.

The heater 56 is configured to receive a feed of crushed limestone (e.g., limestone fines) through a first feed line 52. The heater 56 is configured to cook the limestone so as to convert the limestone from being calcium carbonate to quicklime. As such, the heater 56 can achieve temperatures in excess of 825° C. in order to drive carbon gas from the limestone. The quicklime can then be provided as a supply of quicklime 64 for further processing.

Optionally, the pelleting system includes a rock crusher 54 that is configured to receive limestone rocks 53 and crush the limestone rocks to a much smaller size. That is, the rock crusher 54 can crush the limestone rocks into smaller rocks, pebbles, grains, powders and the like so that the crushed limestone can be provided as crushed limestone 55 into the heater 56. The rock crusher 54 is optional because limestone can be obtained in a crushed form that does not need to be reduced in size before being cooked into quicklime 64.

The mixer 62 has a water feed line 58 and a binder feed line 60 that supplies the water and binder, respectively, to be mixed into an aqueous binder mixture 66. The mixer 62 can be configured for variable speed and shear mixing at elevated temperatures. As such, the mixer 62 can be any type of mixer that can mix water and a binder. Also, the mixer 62 can include heating elements so that the mixing can be conducted at an elevated temperature as needed.

The quicklime 64 and aqueous binder mixture 66 are supplied into the extruder 68, and mixed into a hydrating composition capable of being extruded. For example, the aqueous binder can be sprayed, soaked, squirted, streamed, dripped, or otherwise added onto the lime fines. As such, when the quicklime 64 intermingles with the aqueous binder mixture 66, the water can react with the quicklime 64 in order to produce hydrated lime. The hydrating reaction is exothermic and can produce any heat that may be needed in order to produce an extrudable mixture. Also, the extruder 68 can be configured to modulate the time it may take to process the hydrating lime into hydrated lime while in the extruder so that varying degrees of reaction completion can be achieved. This can include partial hydration to full hydration of the quicklime into hydrated lime. Alternatively, the water and binder can be introduced separately.

Optionally, while being mixed and hydrated, the lime composition can be moved through the extruder 68 so as to pass by heating elements (not shown). The heating elements can provide for a ramped increase or parabolic change in temperature in order to gradually remove the solvents and/or increase the liquidity of the binder before extrusion. While the hydrating reaction is exothermic, the heating elements may additionally increase the temperature of some binders so that the binder is sticky or capable of binding the lime fines together. This can be especially favorable for rubber binders.

As the hydrating lime composition moves to the end of the extruder 68, it passes through the die head 70 before being extruded through the die opening 72. The die head 70 and die opening 72 can be configured into any shape or arrangement so long as to produce a pelletable extrudate 74. In another embodiment, the hydrated lime extrudate 74 can itself form pellet-sized spheroids by having a plurality of die openings 72 in the die head 70, which is properly configured as is well known in the art.

In some instances when the hydrated lime extrudate 74 leaves the die opening 72, it can be too moist to be pelleted. As such, it can be beneficial to dry the hydrated lime extrudate 74 in an optional dryer 76 before being pelleted to remove any solvent. The dried extrudate can have a moisture content below about 15%, more preferably below about 10%, and most preferably below about 5% before being pelleted.

On the other hand, the hydrated lime extrudate 74 may be at an elevated temperature from the extruding process so as to have thermoplastic characteristics (i.e., being in a flowable or gummy state). As such, it can be beneficial to cool the hydrated lime extrudate 74 before pelleting. For example, the extrudate can be cooled to a temperature of less than 35° C., more preferably a temperature less than about 30° C., and most preferably less than 25° C. in the cooling apparatus 76 before being pelleted.

After the hydrated lime extrudate 74 is dried and/or cooled, it is supplied to the pelletizer 78. The pelletizer 78 can be configured for cutting the hydrated lime extrudate 34 into a variety of shapes and sizes. For example, the hydrated lime extrudate 74 can be cut into pellets having a diameter range from about 1.5 mm (about 0.05 inches) to about 2.54 cm (about 1 inch), more preferably in a range of from about 2 mm (about 0.08 inches) to about 2 cm (about 0.8 inches), even more preferably about 3 mm (about 0.1 inches) to about 1.5 cm (about 0.6 inches), and most preferably in a range of from about 6 mm (about 0.2 inches) to about 1 cm (about 0.4 inches).

The lime pellets can then be supplied from the pelletizer 78 to an optional conditioning assembly 80, which can condition the pellets for storage in a pellet collector 82, or for further processing. For example, the conditioning assembly 80 can be configured to harden the pellets, apply a water-resistant coating such as a water-resistant polymer (e.g., PVA) or a wax, or apply a lubricious coating so as to reduce the friction between the pellets.

Figure 3:
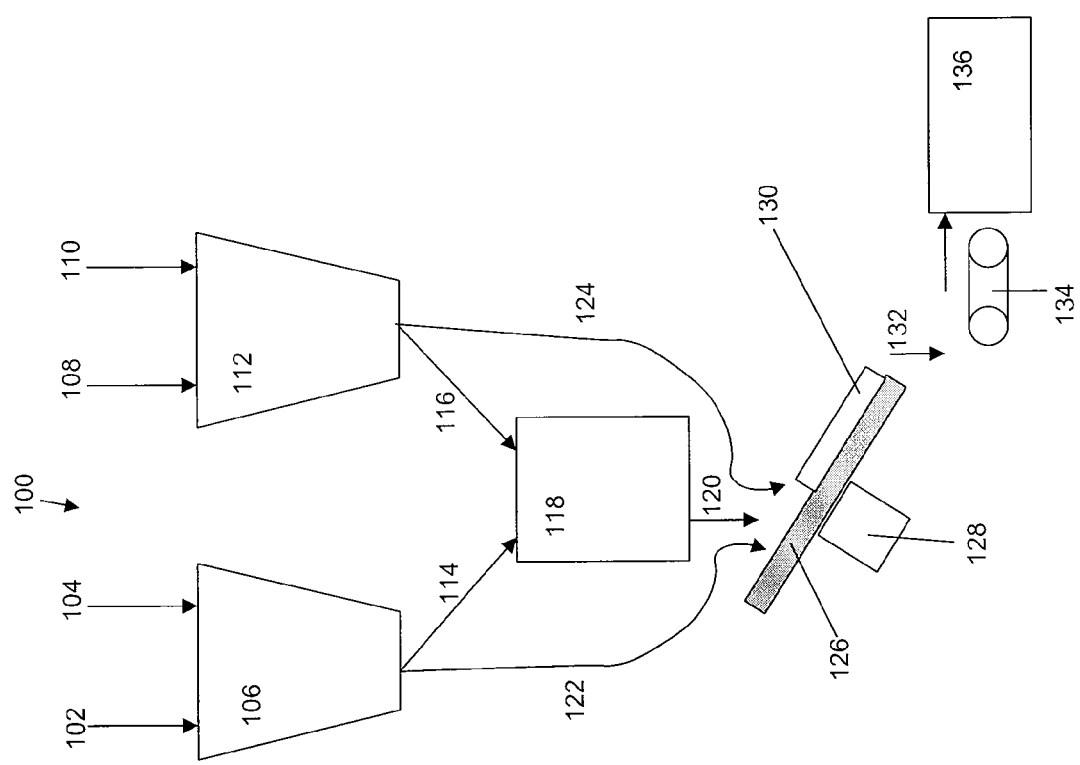
FIG. 3 is a schematic representation that illustrates an embodiment of a pelleting system and process for preparing lime pellets.

Referring now to FIG. 3, one embodiment of a pelleting system 100 is illustrated. As such, a lime feed line 102 is introduced into a lime vessel 106, where it can be mixed with an optional conditioner such as a solvent, rheology-modifier, additive, or other particulate filler material that is supplied by the optional feed line 104. The lime vessel 106 can include a heating element, mixing equipment, or other processing equipment for conditioning the lime fines. Otherwise, the lime fines can be supplied into the lime vessel 106 so that it can be precisely metered during the pelleting process.

Additionally, a binder feed line 108 is introduced into a binder vessel 112, where it can be mixed with an optional conditioner such as a solvent, rheology-modifier, other particulate or conditioning material, or adhesive additive supplied by the optional feed line 110. Also, the binder vessel 112 can be configured to accurately meter the binder composition for preparing the pellets. Moreover, the binder vessel 112 can be substantially similar to the lime vessel 106.

In one embodiment, when the lime is ready for further processing, it is supplied into an optional mixer 118 via line 114 and combined with binder provided by line 116. The mixer 118 can then mix the lime and the binder together into a substantially homogeneous or uniform mixture.

A supply of a lime-binder composition can then be provided from the mixer 118 to a disc pelletizer 126 via line 120. The disc pelletizer 126 spins so as to cause the lime-binder composition to roll and ball into pellets, which are then removed from the disc pelletizer 126 via the hood 130 as a pellet flow 132.

Alternatively, a supply of lime can be provided by the lime vessel 106 directly to the disc pelletizer 126 via line 122. The lime composition resides on the disc pelletizer 126, which is rotated by a drive system 128, until a supply of binder is provided from the binder vessel 112 via line 124. The binder (e.g. hydrophobic, hydrophilic, aqueous, or the like) is applied (e.g. drop-wise, sprayed, streamed, nebulized, or the like) by a slow flowing line, or spray onto the lime on the disc pelletizer 126. As the binder contacts the lime, a small pellet is formed. Thus, by providing a plurality of binder droplets, binder spray, or a binder stream to the lime, the pellets can individually form, or optionally combine, until large enough to be removed through the hood 130.

After the pellets are formed, a pellet flow 132 can supply the pellets onto a conveyor 134 that transports them to storage 136. Additional processing can then be performed with the lime pellets as described herein.

In an alternative embodiment, the lime and/or binder can be supplied directly to the disc pelletizer 126 without any processing, mixing, or conditioning. As such, the lime can be supplied via line 122 and the binder can be supplied by line 124, which then are combined on the disc pelletizer 126. This can include the lime being quicklime and/or hydrated lime, and the binder can be liquid, emulsion, suspension, aqueous, or the like. This can greatly simplify the pelleting process.

Figure 4:
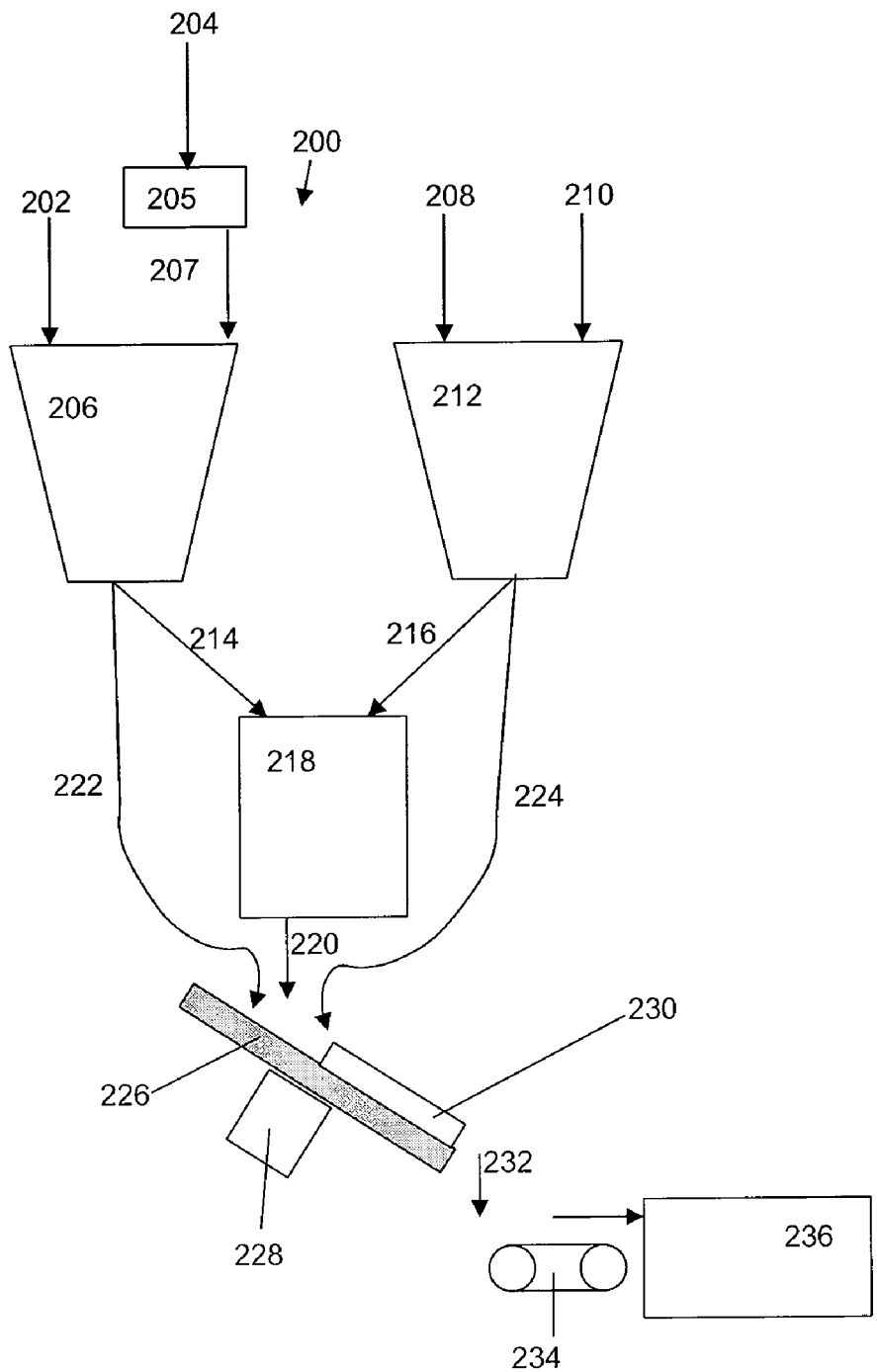
FIG. 4 is a schematic representation that illustrates an embodiment of a pelleting system and process for preparing lime pellets.

Referring now to FIG. 4, one embodiment of a pelleting system 200 is illustrated. The pelleting system 200 includes a heater 206, optional rock crusher 205, mixer 212, optional lime mixer 218, disc pelletizer 226, conveyor 234, and storage facility 236.

Crushed limestone 202 is introduced into the heater 206, where it can be heated in order to cook the limestone into quicklime as described herein. The heater 206 is configured to heat the limestone to a temperature of at least 825° C. in order to convert the calcium carbonate into calcium oxide or quicklime.

Optionally, limestone rock 204 is introduced into the optional rock crusher 205 so that the limestone rock 204 can be crushed into small limestone rocks, pebbles, powder, or other particulate form of limestone. The crushed limestone 207 is then introduced into the heater 206 as described herein. The rock crusher 205 is optional because limestone can be obtained in an already crushed form.

A binder feed line 208 and a water feed line 210 are introduced into the mixer 212 in order to produce an aqueous binder composition. The mixer 212 can include a heating element, mixing equipment, or other processing equipment for preparing the aqueous binder composition. Also, the mixer 212 can be used to mix the aqueous binder composition with optional conditioners, such as a solvent, rheology-modifier, other particulate, conditioning material, or adhesive additive. Also, the mixer 212 can be configured to accurately meter the aqueous binder composition for preparing the lime pellets.

In one embodiment, when the quicklime is ready for further processing and conversion to hydrated lime, it is supplied into an optional lime mixer 218 via line 214 and combined with the aqueous binder composition provided by line 216. The mixer 218 can then mix the lime and the aqueous binder together into a substantially homogeneous or uniform mixture. This can allow for the quicklime to be hydrated into hydrated lime. As such, when the quicklime intermingles with the aqueous binder mixture, the water can react with the quicklime in order to produce hydrated lime. Also, the optional lime mixer 218 can be configured to modulate the time it may take to process the quicklime into hydrated lime so that varying degrees of reaction completion can be achieved. This can include partial hydration to full hydration of the quicklime into hydrated lime.

Additionally, the hydrating lime can be intermingled with the binder so that the lime can be formed into a pellet. This can include the hydrated lime with or without quicklime being intermingled with the binder. By mixing the hydrated lime and binder in a mixer, accurate amounts of the mixture can be further processed into pellets, which can be useful for modulating the size of the resulting pellets.

A supply of a hydrated lime-binder composition can then be provided from the mixer 218 to the disc pelletizer 226 via line 220. The disc pelletizer 226 spins so as to cause the hydrated lime-binder composition to roll and ball into pellets, which are then removed from the disc pelletizer 226 via the hood 230 as a pellet flow 232.

Alternatively, a supply of quicklime can be provided by the heater 206 directly to the disc pelletizer 226 via line 222. The quicklime composition resides on the disc pelletizer 226, which is rotated by a drive system 228, until a supply of the aqueous binder composition is provided from the mixer 212 via line 224. The aqueous binder composition is applied drop-wise by spraying or by a stream to the quicklime on the disc pelletizer 226. Alternatively, the water and binder can be added separately as different sprays that are sprayed onto the lime fine at the same fine, intermittently, or the spray water before the binder spray. As the water and binder contacts the quicklime, the water initiates the hydration reaction to form hydrated lime and the binder binds the quicklime and/or hydrated lime so as to form a pellet. Accordingly, the quicklime can be hydrated into hydrated lime while the pellets are forming, and the hydration reaction can continue after the pellets form until the water and/or quicklime is consumed. Thus, by providing a plurality of aqueous binder droplets (e.g.

stream, drop-wise, or spray) the quicklime can be converted to hydrated lime as the pellets can individually form, or optionally combine, until large enough to be removed through the hood 230.

After the lime pellets are formed, a pellet flow 232 can supply the pellets onto a conveyor 234 that transports them to storage 236. Additional processing can then be performed with the lime pellets as described herein.

In an alternative embodiment, the quicklime can be combined with the water in the absence of the binder. This can allow the water to hydrate the quicklime into hydrated lime before being bound into the pellet. For example, the quicklime can be supplied into the optional lime mixer 218 with water in order to hydrate the quicklime into the hydrated lime, and the hydration reaction can be conducted for any length of time and to any degree of completion. The hydrated lime can then be supplied to the disc pelletizer 226 via line 220, and the binder can be supplied directly onto the hydrated lime on the disc pelletizer 226.

In another alternative represented by FIG. 4, quicklime and water can be introduced as a line feed (e.g., 204) into a pre-hydrator or hydrolyzer (e.g., 205). The pre-hydrated quicklime (e.g., 207) is then introduced into a pre-dryer (e.g., 206), and a solvent is added in a line feed (e.g., 202). Then, the partially hydrated quicklime (e.g., 222) is added onto the disk pelletizer 226 and pelleted as described. Further, line feeds (e.g., 208 and 210) can be additives and binders that are introduced into a binder tank (e.g., 212), and the resulting binder premix (e.g., 216) can be combined with the lime (e.g., 214) and then added as mixture (e.g., 220) to the pelletizer 226. Alternatively, the resulting binder premix (e.g., 224) can be added directly to the pelletizer 226 with the lime (e.g., 222).

Also as shown, the pelletizer can include a pelletizer collar and a pellet overflow collector and discharger (e.g., 230), where the pelletizer is operated (e.g., rotated) by a drive collar/motor (e.g., 228). Optionally, the pellets 232 can be coated by a coater for making shell pellets. The conveyer 243 can carry the pellets 232 to a final drum dryer (e.g., 236) prior to storage.

Additionally, various other methods for preparing pellets can be used to manufacture the lime pellets in accordance with the present invention. For example, lime can be mixed with a binder and prilled through a prilling tower, which drops the lime-binder mixture through water in order to form the pellets. Also, the lime-binder mixture can be processed through a pastillator machine which forms pastilles on a revolving belt that are then scraped off.

The water and/or binder solution can also be applied to the lime by various processes. This can include the solution being applied drop-wise, by stream, sprayed, the lime being immersed into a container having the solution, in a mixer, and any other method. The variability in hydration and/or binding processes adds flexibility to the process of manufacturing lime pellets.

In one embodiment, the limestone is cooked into quicklime and then hydrated into hydrated lime within the same apparatus. Accordingly, heaters, mixers, extruders, and the like can be configured for cooking the limestone and for hydrating the quicklime. Additionally, the binding of the lime fines into pellets may be performed within the same apparatus or system as the cooking and hydrating. For example, an extruder or pre-extruder compartment can be configured for receiving limestone fines and cooking the fines into quicklime. Water can then be added to the quicklime within the extruder in order to hydrate the quicklime into hydrated lime. Also, the binder can be added into the extruder with or separate from the water. Thus, the process of preparing lime fines from limestone can be greatly simplified by conducting multiple steps within the same apparatus or continuous system.

The methods of manufacturing lime pellets of the present invention overcome prior problems associated with forming hydrated lime by adding water to quicklime to form a slurry that is then dried to a hydrated lime powder. The process of forming the hydrated lime powder can be eliminated because the quicklime can be hydrated and bound without forming an intermediate hydrated lime powder. Eliminating the process of preparing a hydrated lime powder is advantageous by avoiding problems associated with handling lime fines, and can allow the lime pellets to be prepared at substantially the same cost as that is required to prepare the hydrated lime powders.

Additionally, the various steps and processes described herein can be rearranged, combined, eliminated, or otherwise modified in order to produce the lime pellets of the present invention. As such, the various equipment and/or processing steps illustrated in one figure can be combined with those of other figures as appropriate.

V. Conditioning Hot Mix Asphalt

In one embodiment, the lime pellets can be used in modifying asphalt pavement. More particularly, the lime pellets can be used for modifying asphalt pavement by being added to at least one of the ingredients of hot mix asphalt during the manufacture thereof.

Figure 5:
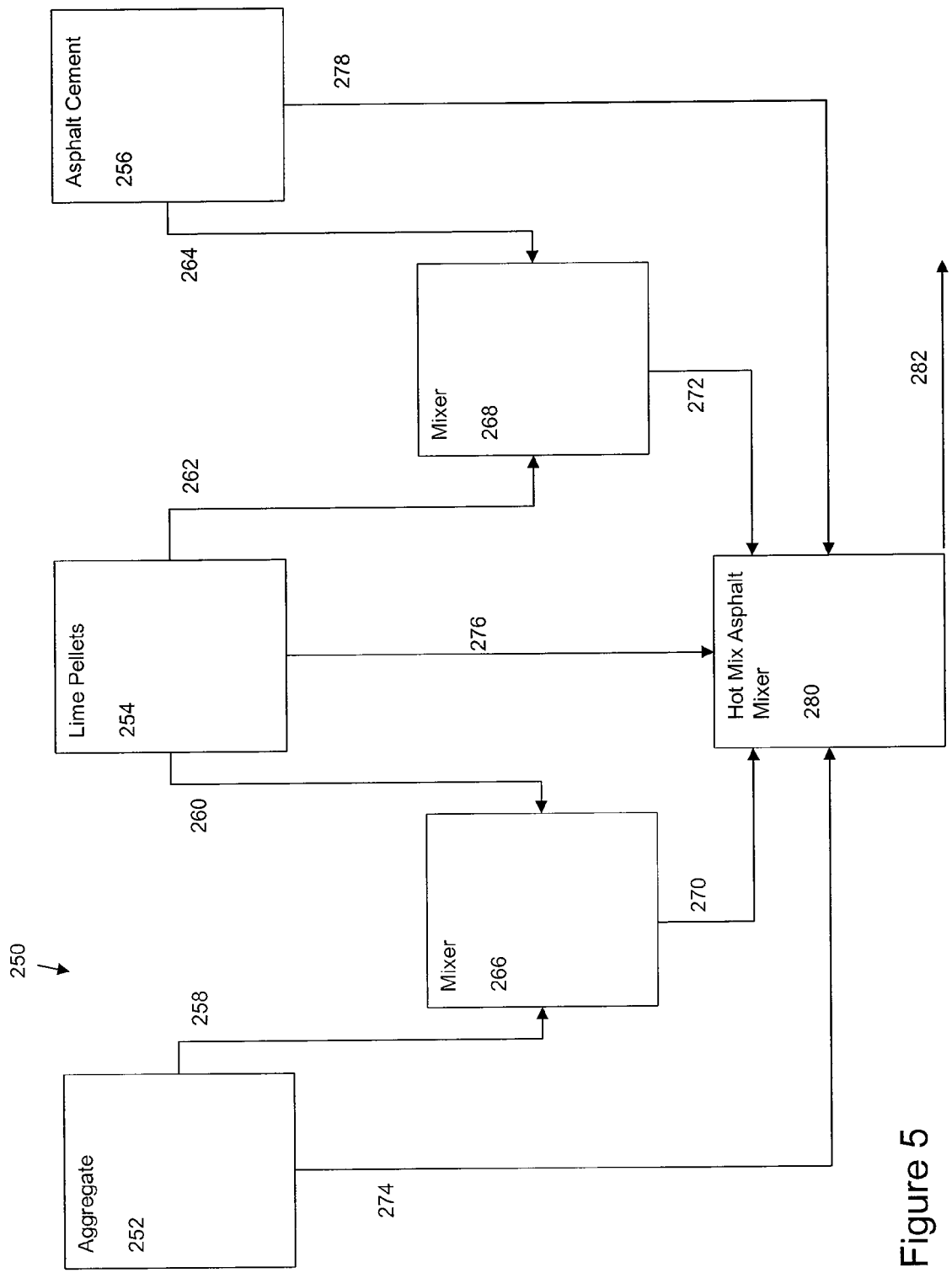
FIG. 5 is a schematic representation that illustrates an embodiment of a system and process for conditioning asphalt during the manufacture of hot mix asphalt.

Accordingly, FIG. 5 includes a schematic diagram depicting an embodiment of a system and process 250 for conditioning asphalt pavement. Such a conditioning system and process 250 includes an aggregate supply 252, a lime pellet supply 254, and an asphalt cement supply 256. Additionally, the conditioning system and process 250 includes a means for combining lime pellets with at least one of the aggregates such as sand, asphalt cement, or even with the hot mix asphalt itself.

In one embodiment, the aggregate supply 252 supplies aggregate material to a mixing vessel 266 via line 258. Additionally, the lime pellet supply 254 supplies lime pellets to the mixing vessel 266 via line 260. As such, the aggregate and lime pellets are mixed together in the mixing vessel 266. The lime pellets and aggregate can each be accurately measured so that a predetermined amount of aggregate and lime pellets can be supplied into the hot mix asphalt. For example, the lime can be metered and combined with a known amount of aggregate so that the lime is present from about 0.05% to about 10% by weight of aggregate, more preferably from about 0.1% to about 5% by weight, and most preferably about 0.5% to about 2.5% by weight of aggregate.

In one embodiment, the asphalt cement supply 256 supplies the asphalt cement such as bitumen to a second mixing vessel 268 (e.g., vortex mixer) via line 264. Optionally, the asphalt cement supply 256 is contained within a vessel, which may be equipped with heating elements (not shown) in order to heat the asphalt cement into a liquefied state in preparation for being combined with the lime pellets. Additionally, the lime pellet supply 254 supplies lime pellets to the second mixing vessel 268 via line 262. As such, the asphalt cement and lime pellets are mixed together in the second mixing vessel 268, which can be equipped with heating elements (not shown) so that the asphalt cement is heated to a temperature sufficient for dissolving the lime pellets. This includes increasing the temperature of the asphalt cement past its melting point and past the melting or dissolving point of the lime pellet. For example, the second mixing vessel 268 can be heated to a dissolving temperature of greater than about 125° C., more preferably greater than about 150° C., even more preferably greater than about 200° C., and most preferably greater than about 250° C.

In one embodiment, the second mixing vessel 268 (e.g., vortex mixer) can be configured for rapidly increasing the temperature of the lime pellets. As such, the lime pellets can be rapidly dissolved upon being introduced into the second mixing vessel 268 and upon contacting or being entrained within a liquefied asphalt cement composition. For example, a second mixing vessel 268 can rapidly heat the lime pellets so that they are substantially dissolved within a timeframe of less than about 1 minute, more preferably less than about 30 seconds, even more preferably less than about 20-seconds, and most preferably less than about 10 seconds. Additionally, in certain embodiments it can be preferred that the lime pellets dissolve within about 5 seconds to about 15 seconds.

The amount of asphalt cement and lime pellets that are mixed can be predetermined so that the resulting hot mix asphalt contains the proper amount of each component. Usually, it is preferred that the lime is present in an amount greater than 10% by weight of asphalt cement, more preferably between about 10% to about 30% by weight, and most preferably between about 12% to about 28% by weight of asphalt cement.

In one embodiment, the aggregate-lime mixture can be supplied from the mixing vessel 266 to the hot mix vessel 280 (e.g., pugmill, drum mixer, etc.) via line 270. Additionally, asphalt cement can be transported to the hot mix vessel 280 directly from the asphalt cement supply 256 via line 278. As such, the lime pellets and aggregate can be added directly into liquefied asphalt cement and mixed so that the resulting hot mix asphalt 282 supplied from the hot mix vessel 280 has a substantially homogeneous or uniform composition.

In order to enhance mixing, the hot mix vessel 280 (e.g., pugmill, drum mixer, etc.) can be equipped with a heating element so that the temperature is sufficiently high for maintaining a liquid continuous phase comprised of asphalt cement. Also, the temperature should rapidly dissolve the lime pellets so that the lime component can be evenly distributed throughout the hot mix asphalt, wherein the temperature can be substantially the same as described-above with respect to the second mixer 268 (e.g., vortex mixer) so as to achieve dissolution of the pellets within the foregoing timeframes.

In one embodiment, the aggregate can be supplied from the aggregate supply 252 directly into the hot mix vessel 280 (e.g., pugmill, drum mixer, etc.) via line 274. Additionally, the asphalt-lime mixture prepared in the second mixer 268 (e.g., vortex mixer) can be transported directly into the hot mix vessel 280 via line 272. Usually, the liquefied asphalt-lime mixture is added to the hot mix vessel 280 prior to the addition of aggregate. In any event, the aggregate is mixed into the liquid asphalt-lime mixture under heat so as to form hot mix asphalt 282 with a substantially homogeneous or uniform composition.

In one embodiment, the asphalt cement supply 256 supplies liquefied asphalt cement directly into the hot mix vessel 280 via line 278. The hot mix vessel 280 heats the asphalt cement so as to maintain or obtain liquid asphalt having the foregoing temperatures for providing the same lime pellet dissolution rates. Additionally, the lime pellet supply 254 supplies the lime pellets directly into the liquid asphalt within the hot mix vessel 280 via line 276. After the lime pellets have dissolved into the liquefied asphalt, aggregate from the aggregate supply 252 can be added directly into the hot mix vessel 280 via line 274 and mixed with the liquid asphalt-lime composition. After adequate mixing, a hot mix asphalt 282 is ready for use or further processing.

In view of the foregoing system and process 250 for manufacturing and conditioning hot mix asphalt, various other modifications and additions can be made under the current inventive concept. As such, additional supplies of sand, fly ash, adhesive additives, other fillers, and any other additive useful for preparing hot mix asphalt can be used and added to the system and process 250. Thus, many variations can be made to the process for using lime pellets for manufacturing and conditioning asphalt pavement.

VI. Binding Asphalt Layers

In one embodiment, the lime pellets can be used for enhancing the adhesion between two layers of asphalt pavement. As such, the lime pellets can be applied over the surface of a first layer of asphalt, and then the lime pellets are coated with a second layer of asphalt.

Figure 6:
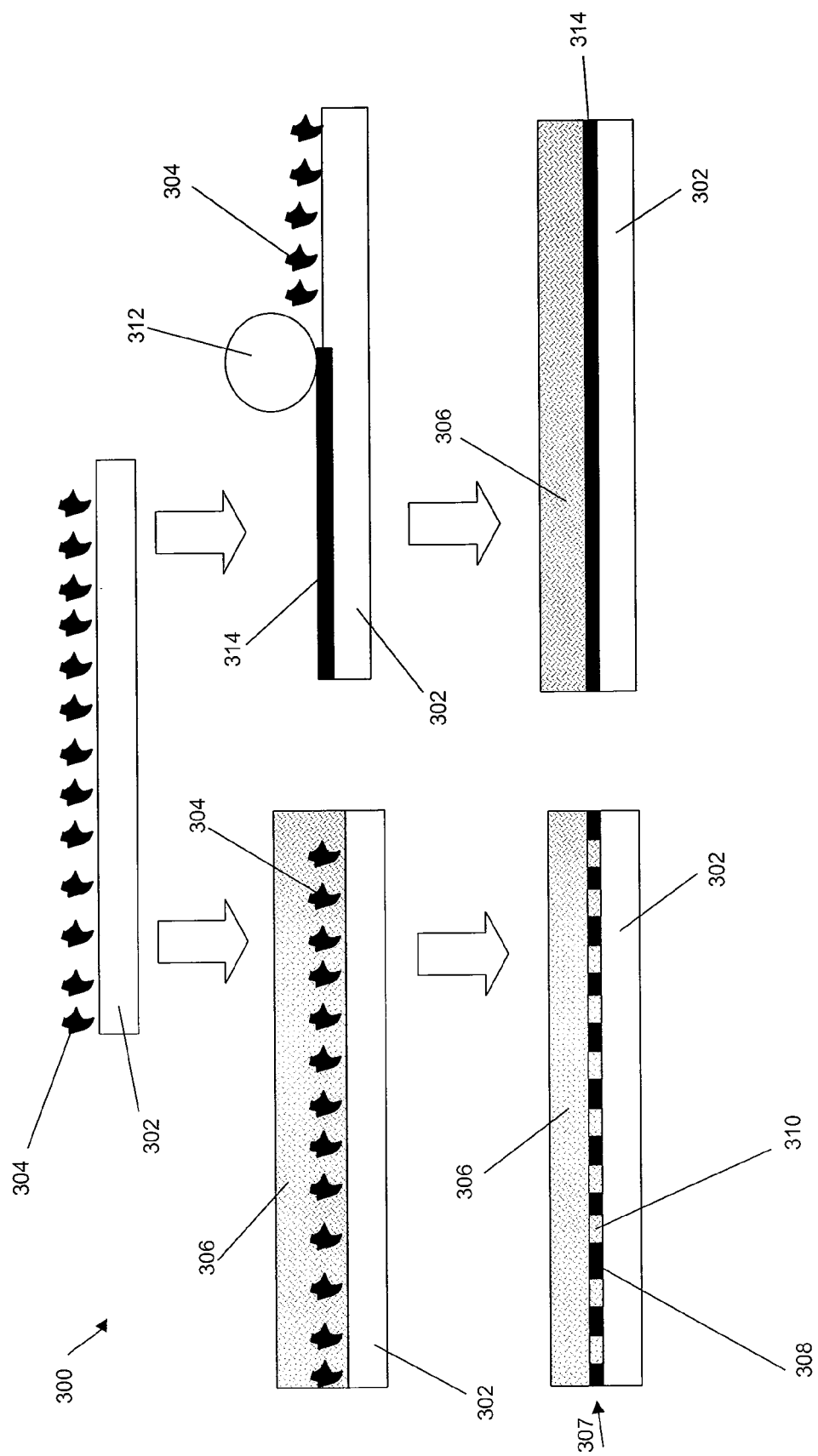
FIG. 6 is a schematic representation that illustrates embodiments of asphalt paving with lime pellets.

With reference now to FIG. 6, a schematic diagram illustrates embodiments of a bonding process 300 for binding different layers of asphalt pavement together. The bonding process 300 can be performed over an old or new layer of asphalt pavement 302. The asphalt pavement layer 302 can be an old layer of asphalt pavement that needs a topcoat or surfacing, or a new layer that has been recently deposited. In any event, the lime pellets 304 are applied over the asphalt pavement layer 302.

The lime pellets 304 can be applied to the asphalt pavement layer 302 by a variety of processes. Some of the exemplary processes include dumping the pellets into piles and raking or otherwise distributing the individual pellets substantially evenly across the top of the asphalt pavement layer 302. Alternatively, the lime pellets 304 can be substantially evenly sprinkled over the asphalt pavement layer 302. The amount of lime pellets 304 over a given area can be varied from a sparse coating where the pellets are spread apart without being in contact with each other through a dense coating where substantially all of the pellets are in contact with each other.

In one embodiment, after the lime pellets 304 have been applied to the first asphalt pavement layer 302, a layer of liquid asphalt cement 306 can be sprayed or otherwise deposited over the pellets 304 and first asphalt layer 302. As such, the liquid asphalt cement 306 can coat the lime pellets 304 and fill any spaces therebetween. Also, the thickness of the liquid asphalt layer 306 can be thick enough to cover the pellets 304 and first asphalt layer 302.

Accordingly, the liquid asphalt can at least partially melt the lime pellets 304 and form a bonding layer 307. The bonding layer 307 can be comprised of pellet portions 308 and asphalt cement portions 310. As such, the pellet portions 308 can impart the lime fines into the asphalt cement portions 310 so as to enhance the bonding between the first asphalt layer 302 and the second asphalt layer 306. Also, since the second asphalt layer 306 is usually applied in a heated and liquid form, the lime fines can also be distributed and suspended into the second asphalt layer 306. Thus, the lime pellets 304 can be used in facilitating and enhancing the bonding between different layers of asphalt.

In another embodiment, after the lime pellets 304 have been applied to the first asphalt pavement layer 302, a heavy roller 312 can be used to smash or compact the lime pellets 304 into a lime layer 314. Alternatively, heat with or without any rolling or compacting devices 312 can be used to flatten the pellets 304 and/or form the lime layer 314. As such, after a lime layer 314 is formed, the second asphalt layer 306 can be deposited thereon. Thus, the lime layer 314 can be used to enhance the bonding between the first asphalt layer 302 and the second asphalt layer 306. While embodiments of processes for adhering asphalt layers together with lime pellets have been depicted and described, it should be appreciated that other variations to such processes can be made within the scope of the invention.

V. Conditioning Soil

In one embodiment, the lime pellets can be used for soil conditioning. Accordingly, essentially any process of applying the lime pellets to the ground can be used to condition the soil with lime. This can include applying the lime pellets to the soil, sand, grass, and the like. The pellets can then be degraded into lime particulates by spraying water on the pellets or allowing the pellets to sit until rain or other natural sources of water degrade the pellets.

In one embodiment, the lime pellets are dissolved, dispersed, suspended, or emulsified in water that is sprayed on the soil. Accordingly, the lime pellets can be dissolved in the water to achieve sufficient concentrations of lime that can be sprayed onto the ground. The concentrations of lime can vary greatly depending on the ground being conditioned. Additionally, any method of applying a soil conditioner to the ground can be used with the lime pellets of the present invention.

EXAMPLES

Example 1

A lime pellet is prepared using a disc pelletizer and associated method. Briefly, a supply of substantially pure calcium hydroxide fines is added to a rotating disc of a disc pelletizer in an amount that enables pellet formation. Liquefied bitumen is then added drop-wise or sprayed onto the calcium hydroxide fines. Pellets are formed by bitumen droplets repeatedly contacting the calcium hydroxide fines, which can spill over edge of the pelletizer when reaching an adequate size. The average size of the pellets is expected to be 0.62 cm with a composition of 31% calcium hydroxide and 69% bitumen.

Example 2

A series of pellets having varying compositions are prepared in accordance with the protocol of Example 1 with minor modifications. Briefly, varying compositions of liquefied hydrophobic binder are added drop-wise to the lime fines (calcium hydroxide and/or calcium oxide). The feed rates of lime and/or binder are modified in order to alter pellet sizes and compositions. The expected shape, size (average diameter), and compositions of the pellets are described in Table 1 as follows:

TABLE 1

| Component | % (by weight) |
|---|---|
| PELLET 1 | |
| Spheroid (0.6 cm) | |
| Calcium hydroxide | 41 |
| Calcium oxide | 10 |
| Bitumen | 40 |
| Manganese oxide | 9 |
| PELLET 2 | |
| Spheroid (0.35 cm) | |
| Calcium hydroxide | 31 |
| Calcium oxide | 5 |
| Bitumen | 60 |
| Calcium Chloride | 1 |
| Polymethylmethacrylate | 3 |
| PELLET 3 | |
| Spheroid (0.5 cm) | |
| Calcium hydroxide | 31 |
| Bitumen | 50 |
| Calcium chloride | 1.5 |
| Sodium chloride | 0.5 |
| Polymethylmethacrylate | 17 |
| PELLET 4 | |
| Spheroid (0.8 cm) | |
| Calcium hydroxide | 60 |
| Bitumen | 35 |
| Calcium chloride | 1 |
| Manganese oxide | 3 |
| Polyethylmethacrylate | 1 |
| PELLET 5 | |
| Spheroid (1.15 cm) | |
| Calcium oxide | 31 |
| Bitumen | 60 |
| Polymethylmethacrylate | 9 |
| PELLET 6 | |
| Spheroid (0.2 cm) | |
| Calcium oxide | 26 |
| Zero Pen AC | 69 |
| Manganese oxide | 4 |
| Carbon black | 1 |
| PELLET 7 | |
| Spheroid (0.95 cm) | |
| Calcium oxide | 60 |
| AC-40 | 20 |
| Bitumen | 15 |
| Styrene-butadiene-styrene | 5 |
| PELLET 8 | |
| Spheroid (1.14 cm) | |
| Calcium oxide | 45 |
| Bitumen | 20 |
| PG-76-22 | 23 |
| Aliphatic petroleum distillate | 2 |
| Manganese oxide | 5 |
| Calcium chloride | 2 |
| Methyltrimethoxysilane | 1 |
| Fly ash | 2 |
| PELLET 9 | |
| Spheroid (2 cm) | |
| Calcium hydroxide | 50 |
| Bitumen | 50 |
| PELLET 10 | |
| Spheroid (0.4 cm) | |
| Calcium hydroxide | 40 |
| Bitumen | 40 |
| Styrene-butadiene-styrene | 20 |
| PELLET 11 | |
| Spheroid (0.5 cm) | |
| Calcium hydroxide | 45 |
| Bitumen | 45 |
| Latex | 10 |
| PELLET 12 | |
| Spheroid (0.3 cm) | |
| Calcium hydroxide | 42 |
| Bitumen | 42 |
| polyethylene vinyl acetate | 16 |

Example 3

A series of pellets having varying compositions are prepared in accordance with the protocol of Example 1 with minor modifications. Briefly, varying compositions of liquefied hydrophilic binder are added drop-wise or sprayed onto the lime fines (calcium hydroxide and/or calcium oxide). The feed rates of lime and/or binder are modified in order to alter pellet sizes and compositions. The expected shape, size (average diameter), and compositions of the pellets are described in Table 2 as follows:

TABLE 2

| Component | % (by weight) |
|---|---|
| PELLET 13 Spheroid (1.2 cm) | |
| Calcium hydroxide | 80 |
| Lignosulfonate | 5 |
| Manganese oxide | 15 |
| PELLET 14 Spheroid (0.35 cm) | |
| Calcium hydroxide | 30 |
| Calcium oxide | 30 |
| Lignosulfonate | 35 |
| Manganese oxide | 4 |
| Carbon black | 1 |
| PELLET 15 Spheroid (0.25 cm) | |
| Calcium hydroxide | 95 |
| Lignosulfonate | 5 |
| PELLET 16 Spheroid (0.45 cm) | |
| Calcium hydroxide | 61 |
| Calcium oxide | 21 |
| Lignosulfonate | 7 |
| Manganese oxide | 4 |
| Fly ash | 5 |
| Carbon black | 2 |
| PELLET 17 Spheroid (0.2 cm) | |
| Calcium hydroxide | 91 |
| Lignosulfonate | 9 |
| Fly ash | 5 |
| Calcium chloride | 3 |
| Carbon black | 2 |
| PELLET 18 Spheroid (2.3 cm) | |
| Calcium hydroxide | 98 |
| Lignosulfonate | 1 |
| Manganese oxide | 1 |
| PELLET 19 Spheroid (1.5 cm) | |
| Calcium hydroxide | 70 |
| Lignosulfonate | 10 |
| Manganese oxide | 20 |
| PELLET 20 Spheroid (1.2 cm) | |
| Calcium hydroxide | 80 |
| Lignosulfonate | 5 |
| Manganese oxide | 15 |
| PELLET 21 Spheroid (1.7 cm) | |
| Calcium hydroxide | 85 |
| Lignosulfonate | 2.5 |
| Manganese oxide | 12.5 |
| PELLET 22 Spheroid (2.4 cm) | |
| Calcium hydroxide | 90 |
| Lignosulfonate | 0.5 |
| Manganese oxide | 9.5 |
| PELLET 23 Spheroid (0.3 cm) | |
| Calcium hydroxide | 61 |
| Calcium oxide | 20 |
| Lignosulfonate | 16 |
| Carbon black | 3 |

Example 4

A lime pellet is prepared using a disc pelletizer and associated method as described in Example 1. Briefly, a supply of lime fines combined with manganese oxide is added to the rotating disc of a disc pelletizer, and Elmer's™ glue (Elmer's Products, Inc.; Columbus, Ohio) is added drop-wise. Pellets are formed by contacting the glue with the lime fines. The average size of the pellets is expected to be 0.95 cm with a composition of 90% lime fines, 0.5% Elmer's glue, and 9.5% manganese oxide.

Example 5

A lime pellet is prepared using a disc pelletizer and associated method as described in Example 1. Briefly, a supply of lime fines combined with manganese oxide is added to the rotating disc of a disc pelletizer, and liquefied brewer's starch is added drop-wise. Pellets are formed by contacting the brewer's with the lime fines. The average size of the pellets is expected to be 1.27 cm with a composition of 97% lime fines, 1% brewer's starch, and 2% manganese oxide.

Example 6

A series of pellets having varying compositions are prepared in accordance with the protocol of Example 1 with minor modifications. Briefly, varying compositions of tall oil pitch are combined with lime fines (calcium hydroxide and/or calcium oxide). The expected shape, size (average diameter), and compositions of the pellets are described in Table 3 as follows:

TABLE 3

| Component | % (by weight) |
|---|---|
| PELLET 24 Spheroid (2 cm) | |
| Calcium hydroxide | 98 |
| Tall oil pitch | 1 |
| Manganese oxide | 1 |
| PELLET 25 Spheroid (1.3 cm) | |
| Calcium hydroxide | 90 |
| Tall oil pitch | 5 |
| Styrene-butadiene-styrene | 3 |
| Manganese oxide | 2 |

TABLE 3-continued

| Component | % (by weight) |
|---|---|
| PELLET 26 | |
| Spheroid (1.5 cm) | |
| Calcium hydroxide | 80 |
| Tall oil pitch | 10 |
| Styrene-butadiene rubber | 5 |
| Phosphorus oxide | 2 |
| Manganese oxide | 3 |
| PELLET 27 | |
| Spheroid (0.8 cm) | |
| Calcium hydroxide | 70 |
| Tall oil pitch | 15 |
| Fly ash | 8 |
| Potassium chloride | 5 |
| Manganese oxide | 2 |
| PELLET 28 | |
| Spheroid (0.5 cm) | |
| Calcium hydroxide | 60 |
| Tall oil pitch | 20 |
| Styrene-butadiene-styrene | 3 |
| Silica | 5 |
| Sand | 2 |
| Sodium chloride | 5 |
| Manganese oxide | 5 |

Example 7

The rate of dissolution of the lime pellets formed with a hydrophobic binder prepared in accordance to Example 2 is determined by addition to mineral oil (Sigma-Aldrich) heated to 150° C. Briefly, a pellet having a dark color is placed into 250 ml of transparent mineral oil in a 500 ml open-mouth flask and stirred with a magnetic stir bar under heat. The pellet is observed to decrease in size until it is unobservable. When the pellet is unobservable, it is considered to be substantially dissolved. The expected time (seconds) in order for each pellet to become substantially dissolved is provided in Table 4 as follows:

TABLE 4

| Pellet | Dissolution Rate (s) |
|---|---|
| 1 | 6 |
| 2 | 11 |
| 3 | 16 |
| 4 | 12 |
| 5 | 19 |
| 6 | 27 |
| 7 | 8 |
| 8 | 12 |
| 9 | 7 |
| 10 | 12 |
| 12 | 14 |

Example 8

The rate of dissolution of the lime pellets formed with a hydrophilic binder prepared in accordance to Example 3 is determined by addition to water heated to 100° C. (212° F.). The expected time (seconds) in order for each pellet to become substantially dissolved is provided in Table 5 as follows:

TABLE 5

| Pellet | Dissolution Rate (s) |
|---|---|
| 13 | 10 |
| 14 | 8 |
| 15 | 16 |
| 16 | 21 |
| 17 | 17 |
| 18 | 5 |
| 19 | 9 |
| 20 | 7 |
| 21 | 6 |
| 22 | 5 |
| 23 | 12 |

Example 9

The stability of pellets having a composition according to Pellet 11 of Example 2 is determined to assess resistance to degradation and agglomeration. Briefly, pellets having the characteristics of Pellet 11 are placed into a 500 ml open-mouth flask and stored in ambient conditions. The resistance to agglomeration and degradation are observed periodically up to 6 months. It is expected that the pellets will not substantially degrade or agglomerate at any time up to the 6-month period.

Example 10

A lime pellet is prepared with the process described herein using a DP-14 Disc Pelletizer. The binder is prepared to include 75% tall oil and 25% denatured alcohol, and the hydrated lime includes 5% magnesium oxide. The lime pellet is air dried.

Example 11

A lime pellet is prepared with the process described herein using a DP-14 Disc Pelletizer. The binder is prepared to include 50% Norlig GI and 50% denatured alcohol, and the hydrated lime includes 5% magnesium oxide. The lime pellet is dried in an oven.

Example 12

A lime pellet is prepared with the process described herein using a DP-14 Disc Pelletizer. The binder is prepared to include 100% tall oil, and the hydrated lime includes 5% magnesium oxide. The lime pellet is air dried.

Example 12

A lime pellet is prepared with the process described herein using a DP-14 Disc Pelletizer. The binder is prepared to include 40% asphalt and 60%.

Example 14

A lime pellet are prepared as described herein. Quicklime fines are hydrated and bound together into pellets with a binder emulsion. The binder emulsion is prepared as a 65% asphalt and 35% water/detergent mixture, which is then diluted with 60% more water to form the aqueous binder solution. The quicklime fines are deposited on a rotating pan mixer and the solution is sprayed on the quicklime fines. The fines hydrate and are bound together until small spherical pellets the size of about 1/16 inch to about 3/8 inch are formed.

Also, pellets the size of about ½ inch can also be formed. The pellets are then dried in a dryer at elevated temperatures. The bulk density of the pellets discharged from the dryer is measured to be about 44.3 lbs/ft$^3$ and have a moisture content of about 27.4% by weight.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of manufacturing lime pellets for use in asphalt manufacturing and/or soil conditioning, the method comprising:

heating limestone ($CaCO_3$) to obtain quicklime (CaO);

hydrating the quicklime with an aqueous solution to obtain hydrated lime ($Ca(OH)_2$) mixture that includes water; and pelletizing the hydrated lime mixture into pellets with a binder that includes the hydrated lime bound with the binder, wherein the hydrated lime is not dried or converted to a powder prior to the pelletizing with the binder, and wherein the binder comprises at least one of bitumens, tall oil pitch, asphalt cements, lignosulphonates, latexes, polysaccharide or derivative thereof, tannin liquor, collagen derivative, beet molasses derivative, plastomer polymers, rubber, grooved tire rubber, pre-reacted grooved tire rubber, or elastomer polymers.

2. A method capable of hydrating the quicklime in claim 1, further comprising crushing the limestone into a limestone powder before being heated into quicklime.

3. A method as in claim 1, further comprising heating the limestone to a temperature of at least about 825° C.

4. A method as in claim 1, further comprising preparing an aqueous binder solution to include water and a binder that binds hydrated lime fines.

5. A method as in claim 4, wherein the aqueous binder solution is an emulsion.

6. A method as in claim 1, wherein the hydrating and pelletizing are conducted with a pelletizer.

7. A method as in claim 1, further comprising:

providing quicklime fines into a rotating disc of a pelletizer;

adding water and binder onto the quicklime fines on the rotating disc so as to hydrate the quicklime and form pellets; and removing the pellets from the rotating disc, said pellets comprising hydrated lime fines bound together with the binder.

8. A method as in claim 1, wherein the binder is a hydrophobic binder that is present in the pellet at about 0.5% to about 69% by total weight of the pellet.

9. A method as in claim 1, wherein the binder is a hydrophilic binder that is present in the pellet at about 0.5% to about 69% by total weight of the pellet.

10. A method as in claim 1, wherein the binder is present in the pellet at about 0.5% to about 69% by total weight of the pellet.

11. A method of manufacturing lime pellets for use in asphalt manufacturing and/or soil conditioning, the method comprising:

obtaining crushed limestone ($CaCO_3$) fines;

heating the limestone fines to a temperature of at least about 825° C. to release $CO_2$ and obtain quicklime (CaO) fines;

hydrating the quicklime fines with an aqueous solution to obtain of hydrated lime ($Ca(OH)_2$) fines;

binding the hydrate lime fines with a binder; and pelletizing the hydrated lime and binder into hydrated lime pellets that include hydrated lime fines bound together with the binder, wherein the binder comprises at least one of bitumens, tall oil pitch, asphalt cements, lignosulphonates, latexes, polysaccharide or derivative thereof, tannin liquor, collagen derivative, beet molasses derivative, plastomer polymers, rubber, grooved tire rubber, pre-reacted grooved tire rubber, or elastomer polymers.

12. A method as in claim 11, further comprising crushing the limestone into a limestone powder before being heated into quicklime.

13. A method as in claim 11, further comprising preparing the aqueous solution to include water that hydrates the quick lime and a binder that binds hydrated lime fines.

14. A method as in claim 13, wherein the aqueous solution is an emulsion, dispersion, or suspension.

15. A method as in claim 11, wherein the hydrating and pelletizing are conducted with a pelletizer system.

16. A method as in claim 15, further comprising:

providing the quicklime in the form of a powder into a rotating disc of a pelletizer;

adding water and binder onto the quicklime powder on the rotating disc so as to hydrate the quicklime and form pellets; and removing the pellets from the rotating disc, said pellets comprising hydrated lime fines bound together with the binder.

17. A method as in claim 15, further comprising:

combining the quicklime in the form of a powder with the aqueous solution to form a suspension of hydrated lime in the aqueous solution;

providing the suspension into a rotating disc of a pelletizer so as to form pellets; and removing the pellets from the rotating disc, said pellets comprising hydrated lime fines bound together with the binder.

18. A method as in claim 11, wherein the binder is a hydrophobic binder that is present in the pellet at about 0.5% to about 69% by total weight of the pellet.

19. A method as in claim 11, wherein the binder is a hydrophilic binder that is present in the pellet at about 0.5% to about 69% by total weight of the pellet.

20. A method as in claim 11, wherein the binder is present in the pellet at about 0.5% to about 69% by total weight of the pellet.

21. A method as in claim 20, further comprising combining an additive into the pellet, the additive being present at less than about 30% by total weight of the pellet and comprised of at least one of aliphatic petroleum distillate, latexes, calcium chloride, manganese oxide, styrene-butadiene-styrenes, styrene-etheylene/butylene-styrenes, styrene isoprenes, styrene ethylbutylenes, styrene butadiene rubber latexes, polychloroprene latexes, polyisoprenes, polyethylene acetates, polyethylenes and derivatives, polypropylenes and derivatives, acrylic polymers, silicone-based polymers, or polydimethylsiloxanes.

22. A method as in claim 11, wherein the hydrated lime is present in the pellet in an amount greater than about 31% by weight.

23. A method as in claim 11, further comprising dimensioning the pellet to have a dimension greater than about 1.5 mm.

24. A method as in claim 11, wherein the hydrating is less than 100% and the pellets include quicklime.

25. A method as in claim 11, further comprising combining an additional component into the pellet, said additional component being at least one of a salt, rheology-modifier, elastomer, plastomer, structural additive, solvent, or color-imparting agent.

* * * * *